United States Patent
Nakano et al.

(10) Patent No.: US 12,554,574 B2
(45) Date of Patent: Feb. 17, 2026

(54) COMMUNICATION SYSTEM, MANAGEMENT DEVICE, AND TERMINAL

(71) Applicant: Hitachi Industrial Equipment Systems Co., Ltd., Tokyo (JP)

(72) Inventors: Ryo Nakano, Tokyo (JP); Kazuto Shirane, Tokyo (JP); Tasuku Suzuki, Tokyo (JP); Hiroki Yamada, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 61 days.

(21) Appl. No.: 18/692,132

(22) PCT Filed: Jun. 8, 2022

(86) PCT No.: PCT/JP2022/023197
§ 371 (c)(1),
(2) Date: Mar. 14, 2024

(87) PCT Pub. No.: WO2023/112359
PCT Pub. Date: Jun. 22, 2023

(65) Prior Publication Data
US 2024/0378106 A1  Nov. 14, 2024

(30) Foreign Application Priority Data

Dec. 17, 2021 (JP) .................. 2021-205356

(51) Int. Cl.
*G06F 11/00* (2006.01)
*G06F 11/07* (2006.01)

(52) U.S. Cl.
CPC ........ *G06F 11/079* (2013.01); *G06F 11/0766* (2013.01)

(58) Field of Classification Search
CPC ........................... G06F 11/079; G06F 11/0766
See application file for complete search history.

(56) References Cited

U.S. PATENT DOCUMENTS 4,872,165 A * 10/1989 Mori .................... G06F 11/1625
                                                        714/4.2
5,704,031 A * 12/1997 Mikami .................. G06F 11/22
                                                        709/221

(Continued)

FOREIGN PATENT DOCUMENTS

JP      2006-23910 A    1/2006
JP     2018-524704 A    8/2018

(Continued)

OTHER PUBLICATIONS

C3 Japanese-language Office Action issued in Japanese Application No. 2021-205356 dated Jan. 28, 2025, with English translation (6 pages).

(Continued)

*Primary Examiner* — Philip Guyton
(74) *Attorney, Agent, or Firm* — Crowell & Moring LLP

(57) ABSTRACT

A communication system includes a management device connected to terminals. The terminal is configured to collect log information, send the log information to the management device, analyze the log information to determine whether an abnormal event occurs in the terminal and determining self-recovery processing, notify the management device of the self-recovery processing for the abnormal event, and execute the self-recovery processing for the abnormal event or recovery processing ordered by the management device. The management device is configured to analyze log information collected from the terminals to determine whether an abnormal event occurs in the terminal, determine recovery processing, receive a notification about self-recovery processing from the terminal, and issue an order to execute the recovery processing for the detected abnormal event to the terminal, depending on whether the notification has been received.

10 Claims, 13 Drawing Sheets

(56) References Cited

U.S. PATENT DOCUMENTS

| | | | |
|---|---|---|---|
| 2006/0143602 A1* | 6/2006 | Rothman | G06F 11/2048 |
| | | | 717/171 |
| 2009/0083588 A1* | 3/2009 | Yamashita | G06F 11/0793 |
| | | | 714/47.1 |
| 2013/0086429 A1* | 4/2013 | Ng | G06F 11/0781 |
| | | | 714/38.1 |
| 2013/0318392 A1* | 11/2013 | Guo | G06F 11/1666 |
| | | | 714/6.11 |
| 2014/0289398 A1* | 9/2014 | Nakai | H04L 41/06 |
| | | | 709/224 |
| 2016/0255063 A1* | 9/2016 | Zhang | G06F 11/079 |
| | | | 713/168 |
| 2016/0371585 A1 | 12/2016 | McElhinney et al. | |
| 2019/0303231 A1 | 10/2019 | Togawa | |
| 2024/0378106 A1* | 11/2024 | Nakano | G06F 11/079 |

FOREIGN PATENT DOCUMENTS

| | | |
|---|---|---|
| WO | WO 2017/135226 A1 | 8/2017 |
| WO | WO 2018/122890 A1 | 7/2018 |

OTHER PUBLICATIONS

International Search Report (PCT/ISA/210) issued in PCT Application No. PCT/JP2022/023197 dated Aug. 23, 2022 with English translation (4 pages).

Japanese-language Written Opinion (PCT/ISA/237) issued in PCT Application No. PCT/JP2022/023197 dated Aug. 23, 2022 with English translation (8 pages).

\* cited by examiner 121a, 141a FAULT ANALYSIS CONDITION MANAGEMENT TABLE

| ANALYSIS CONDITION ID | REFERENCE INFORMATION | COMPARISON POLICY | COMPARISON CONDITION | THRESHOLD VALUE | NUMBER OF TIMES OF MATCH |
|---|---|---|---|---|---|
| LteState | LTE CONNECTION STATE | ABSOLUTE VALUE | = | 0 (Disconnected) | 3 |
| CpuRatio | CPU RATIO | ABSOLUTE VALUE | ≥ | 0.95 | 3 |
| PacketDrop | PACKET DROP COUNT | RELATIVE VALUE | > | 300 | 3 |
| FirmVer | FIRM VERSION | ABSOLUTE VALUE | < | 14.01 | 1 |
| ... | ... | ... | ... | ... | ... |

*FIG. 2*

122a, 142a EVENT IDENTIFICAITON CONDITION MANAGEMENT TABLE

| EVENT ID | MATCH CONDITION (1) | MATCH CONDITION (2) | MATCH CONDITION (3) |
|---|---|---|---|
| LteDisconn (Disconnected from LTE) | LteState | | |
| LackRxCapability (Lack of receiving capability caused by load up) | CpuRatio | PacketDrop | |
| OldFirm (Old firmware in use) | FirmVer | | |
| ... | ... | ... | ... |

FIG. 3

123a, 143a RECOVERY PROCESSING MANAGEMENT TABLE

| EVENT ID | NOTIFICATION MESSAGE | RECOVERY MEASURE | WAITING TIME |
|---|---|---|---|
| LteDisconn | [LteReboot] LteDisconn | Reboot communication I/F (LTE) | 5 MIN. |
| LackRxCapability | [Reboot] LackRxCapability | Reboot terminal | 10 MIN. |
| OldFirm | [FirmUpdate] OldFirm | Update firmware | 10 MIN. |
| ... | ... | ... | ... |

FIG. 4

[ FAULT ANALYSIS CONDITION MANAGEMENT TABLE ]

| ANALYSIS CONDITION ID | REFERENCE INFORMATION | COMPARISON POLICY | COMPARISON CONDITION | THRESHOLD VALUE | NUMBER OF TIMES OF MATCH |
|---|---|---|---|---|---|
| LteState | LTE CONNECTION STATE | ABSOLUTE VALUE | = | 0 | 3 |
| CpuRatio | CPU RATIO | ABSOLUTE VALUE | ≥ | 0.95 | 3 |
| PacketDrop | PACKET DROP COUNT | RELATIVE VALUE | > | 300 | 3 |
| FirmVer | FIRM VERSION | ABSOLUTE VALUE | < | 14.01 | 1 |

[ EVENT IDENTIFICAITON CONDITION MANAGMENET TABLE ]

| EVENT ID | MATCH CONDITION (1) | MATCH CONDITION (2) | MATCH CONDITION (3) |
|---|---|---|---|
| LteDisconn | LteState | | |
| LackRxCapability | CpuRatio | PacketDrop | |
| OldFirm | FirmVer | | |

[RECOVERY PROCESSING MANAGEMENT TABLE]

| EVENT ID | NOTIFICATION MESSAGE FOR MANAGEMENT DEVICE | RECOVERY MEASURE | WAITING TIME |
|---|---|---|---|
| LteDisconn | [LteReboot] LteDisconn | Reboot communication I/F | 5 MIN. |
| LackRxCapability | [Reboot] LackRxCapability | Reboot terminal | 10 MIN. |
| OldFirm | [FirmUpdate] OldFirm | Update firmware | 10 MIN. |

*FIG. 9*

| TERMINAL ID | DETECTED EVENT | TIME OF DETECTION | DETECTION SOURCE | RECOVERY PROCESSING |
|---|---|---|---|---|
| TERMINAL a | LTE DISCONNECTION | 2021/9/20 10:30:00 | TERMINAL a | REBOOT COMMUNICATION I/F |

<INFORMATION ON FAULT DETECTION AND RECOVERY>

FIG. 10

141a FAULT ANALYSIS CONDITION MANAGEMENT TABLE (MANAGEMENT DEVICE)

| ANALYSIS CONDITION ID /201 | REFERENCE INFORMATION /202 | COMPARISON POLICY /203 | COMPARISON CONDITION /204 | THRESHOLD VALUE /205 | NUMBER OF TIMES OF MATCH /206 | NUMBER OF TERMINALS TO BE DETECTED SIMULTANEOUSLY /1101 |
|---|---|---|---|---|---|---|
| Multi-LteState | LTE CONNECTION STATE | ABSOLUTE VALUE | = | 0 (Disconnected) | 1 | 5 |
| ... | ... | ... | ... | ... | ... | ... |

FIG. 11A

142a EVENT IDENTIFICAITON CONDITION MANAGEMENT TABLE
(MANAGEMENT DEVICE)

| EVENT ID /301 | MATCH CONDITION (1) /302 | MATCH CONDITION (2) /303 | MATCH CONDITION (3) /304 |
|---|---|---|---|
| NwFailure (Carrier failure) | Multi-LteState | | |
| ... | ... | ... | ... |

*FIG. 11B*

143a RECOVERY PROCESSING MANAGEMENT TABLE
(MANAGEMENT DEVICE)

| EVENT ID /401 | NOTIFICATION MESSAGE /402 | RECOVERY MEASURE /403 | WAITING TIME /404 | ENABLE/DISABLE /1102 |
|---|---|---|---|---|
| NwFailure | | Disable recovery processing of terminal for LTE disconnection (LteDisconn) | 0 MIN. | ENABLE |
| ... | ... | ... | ... | ... |

*FIG. 11C*

123a RECOVERY PROCESSING MANAGEMENT TABLE
(TERMINAL)

| EVENT ID /401 | NOTIFICATION MESSAGE /402 | RECOVERY MEASURE /403 | WAITING TIME /404 | ENABLE/DISABLE /1102 |
|---|---|---|---|---|
| LteDisconn | LteDisconn | Reboot communication I/F (LTE) | 5 MIN. | DISABLE |
| ... | ... | ... | ... | ... |

*FIG. 11D*

| 1301 | 1302 | 1303 |
|---|---|---|
| SCHEDULED ACTIVITY | RELATED TERMINAL | DATE AND TIME |
| UPDATE OF FIRMWARE OF APPARATUSES ON THE SITE (REBOOTING TERMINAL OR COMMUNICATION I/F IS PROHIBITED) | TERMINAL a | 2021/9/20 00:00:00~00:30:00 |
| SCHEDULED SYSTEM HALT | TERMINAL a, TERMINAL b | 2021/9/22 02:00:00~03:00:00 |
| ... | ... | ... |

1300 SYSTEM OPERATION SCHEDULE INFORMATION

COMMUNICATION SYSTEM, MANAGEMENT DEVICE, AND TERMINAL

CLAIM OF PRIORITY

The present application claims priority from Japanese Patent Application No. 2021-205356 filed on Dec. 17, 2021, the content of which is hereby incorporated by reference into this application.

BACKGROUND ART

This invention relates to a method of automatically identifying a fault occurring in any of one or more terminals under management and executing recovery processing for the fault.

In recent years, systems have been developed that remotely monitor and control apparatuses on a site (e.g., a factory) with data collected from the apparatuses through communication terminals. However, increase in number of terminals and complexity of the system causes increase in man-hour for analysis of a fault and recovery from the fault. Automated fault analysis and recovery are demanded.

A solution to this issue is a management device for managing the plurality of terminals. The management device automatically performs fault analysis based on log information collected from the terminals and provides recovery processing. However, when the communication with a terminal is disconnected because of some fault and the management device cannot collect log information required for the fault analysis, the management device gets into difficulties in conducting fault analysis and recovery processing.

Furthermore, in the case where the communication bandwidth is narrow or communication fees are required to collect log information, the frequency of collecting log information has to be lowered; it may take a long time for the management device to detect a fault.

To address these issues, there is an art such that a terminal detects its own fault through self-analysis and conducts recovery processing (for example, Patent Document 1). According to this existing art, the terminal acquires a list of recovery methods from the management device in advance and performs recovery processing with reference to the list when the terminal detects an anomaly through its self-analysis.

This existing art enables a terminal to detect its disconnection from communication by itself and to reinstate the terminal into a connected state through self-recovery, even if the terminal is disconnected from communication. Since the self-analysis by the terminal does not need sending log information to the management device, it can be conducted with a short cycle without increase in bandwidth or communication fee, enabling early fault detection.

Patent Document 1: WO 2017/135226 A

SUMMARY

The fault analysis in Patent Document 1 is, however, conducted only by the terminals; an abnormal event undetectable for a terminal is difficult to be addressed. For example, assume that distribution of firmware from a management device to a terminal is failed and the terminal wrongly keeps using old firmware.

In this case, only the management device or the distributor owns information on the version of the firmware to be applied and the terminal cannot detect by itself that its own firmware is old. Like this example, there are anomalies that are difficult to be detected by a terminal itself but can be detected only by the management device.

It is desirable that such cases be addressed.

This invention is accomplished in view of the above-described issue; an object of this invention is that a terminal is able to recover from being disconnected from communication or to detect its fault earlier through self-fault-analysis or self-recovery and even more, to recover from abnormal events that cannot be detected by the terminal itself.

A communication system according to this invention includes: one or more terminals to be managed; and a management device connected to the terminals, wherein each of the terminals includes: a log information management unit configured to collect own log information of the terminal and send the log information to the management device; a self-fault-analysis unit configured to analyze the log information to determine whether any abnormal event occurs in the terminal and determine self-recovery processing in a case of detecting an abnormal event; a recovery notification sending unit configured to notify the management device of the self-recovery processing for the abnormal event; and a self-recovery processing unit configured to execute the self-recovery processing for the abnormal event or recovery processing ordered by the management device, and wherein the management device includes: a fault analysis unit configured to analyze log information collected from the terminals to determine whether any abnormal event occurs in any of the terminals and determine recovery processing in a case of detecting an abnormal event; a recovery notification receiving unit configured to receive a notification about self-recovery processing for an abnormal event detected by the terminal from the terminal; and a recovery order unit configured to issue or not to issue an order to execute the recovery processing for the abnormal event detected by the fault analysis unit to the terminal, depending on whether the notification has been received.

In this invention, a terminal and a management device both analyze log information of the terminal to determine whether any abnormal event occurs in the terminal. This configuration enables the terminal to detect a fault earlier or recover from a communication disconnected state through self-analysis and self-recovery by the terminal and even more, to recover from an abnormal event undetectable for the terminal itself through the analysis by the management device and a recovery order therefrom.

The details of at least one embodiment of the subject disclosed in this specification are provided in the accompanying drawings and the following description. Other features, fashions, and effects of the subject are clarified in the following description, drawings, and claims.

BRIEF DESCRIPTION OF THE DRAWINGS

FIG. 2 is a diagram for illustrating an example of a fault analysis condition management table of the management device and the terminals in Embodiment 1.

FIG. 3 is a diagram for illustrating an example of an event identification condition management table of the management device and the terminals in Embodiment 1.

FIG. 4 is a diagram for illustrating an example of a recovery processing management table of the management device and the terminals in Embodiment 1.

FIG. 9 is an explanatory diagram illustrating an example of screen display for configuring tables in Embodiment 1.

FIG. 10 is an explanatory diagram illustrating an example of screen display about information on fault detection and recovery in Embodiment 1.

FIG. 11A is a diagram for illustrating an example of a fault analysis condition management table of the management device in Embodiment 2.

FIG. 11B is a diagram for illustrating an example of an event identification condition management table of the management device in Embodiment 2.

FIG. 11C is a diagram for illustrating an example of a recovery processing management table of the management device in Embodiment 2.

FIG. 11D is a diagram for illustrating an example of a recovery processing management table of a terminal in Embodiment 2.

DETAILED DESCRIPTION

Figure 1:
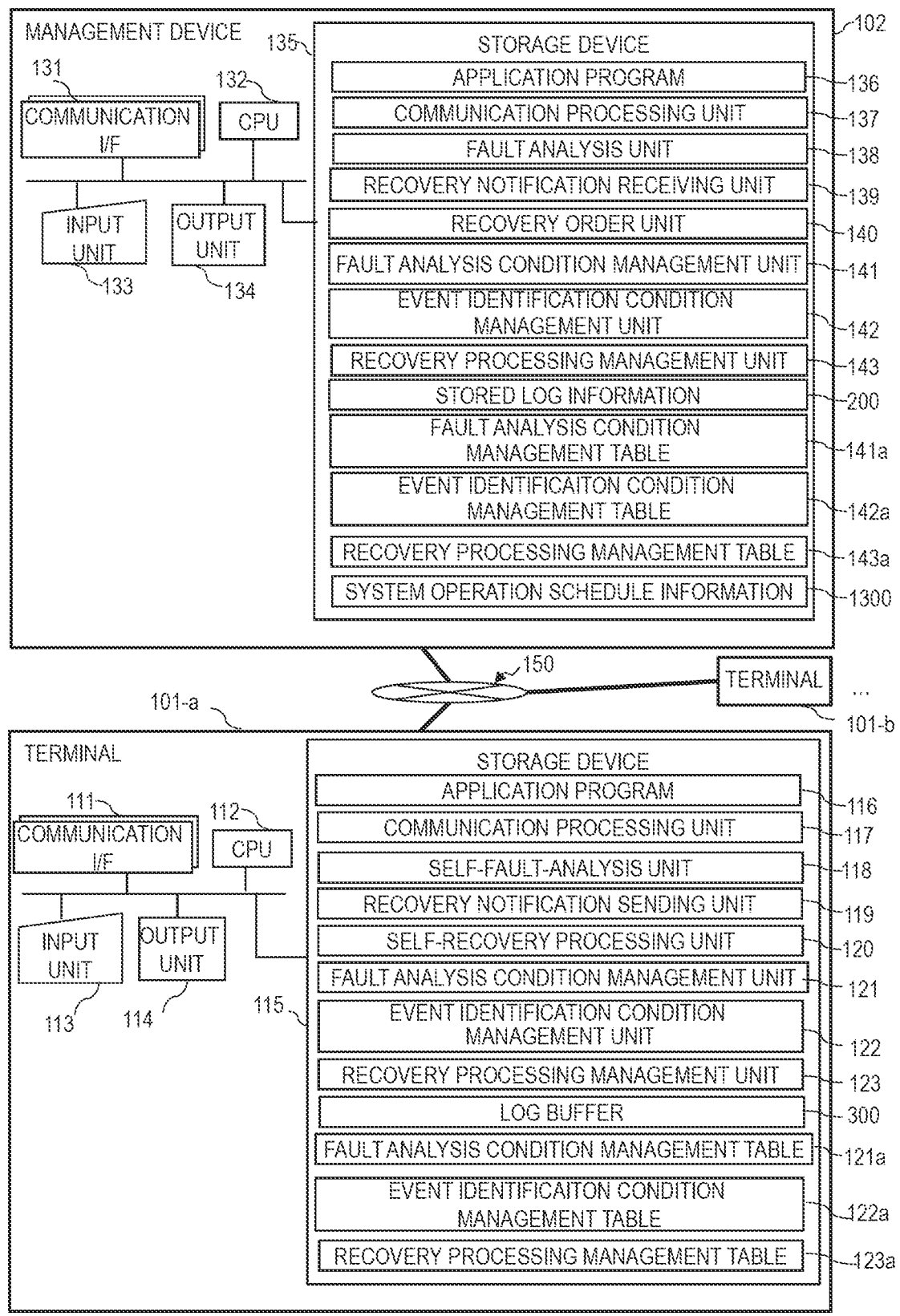
FIG. 1 is a block diagram for illustrating a configuration of a communication system and hardware configurations of a management device and a terminal in Embodiment 1.

First of all, the principle (overview) of this invention is described.

Terminals and a management device each manage a list of fault analysis conditions for log information with their own fault analysis condition management unit. They also manage a list of event identification conditions based on combinations of fault analysis conditions to be satisfied and a list of recovery processing to be executed for individual events with their event identification condition management unit and recovery processing management unit, respectively.

A terminal and the management device identify an abnormal event occurring in the terminal and determine the recovery processing to be executed for the event based on the aforementioned management information. The terminal consults the fault analysis condition management unit to analyze its own log information condition by condition and extract fault analysis conditions satisfied by the log information, using a self-fault-analysis unit.

The terminal successively consults the event identification condition management unit to detect an abnormal event occurring in the terminal based on the combination of satisfied fault analysis conditions. The terminal further consults the recovery processing management unit to determine the self-recovery processing for the abnormal event and the contents for a notification for the management device.

Subsequently, the terminal sends a notification about execution of the recovery processing to the management device using a recovery notification sending unit and executes the recovery processing using a self-recovery processing unit to accomplish self-recovery from the abnormal state.

Likewise, the management device consults its fault analysis condition management unit to analyze the log information acquired from the terminal and extract fault analysis conditions satisfied by the log information, using a fault analysis unit.

The management device successively consults the event identification condition management unit to detect an abnormal event occurring in the terminal based on the combination of the satisfied fault analysis conditions.

Subsequently, the management device consults the recovery processing management unit to determine the recovery processing for the abnormal event. If the management device cannot receive a recovery notification from the terminal through a recovery notification receiving unit, the management device sends an order to execute the recovery processing to the terminal to resolve the abnormal state. If the management device receives a recovery notification from the terminal, the management device cancels the order to execute the recovery processing to avoid execution of redundant recovery processing in the terminal.

As described above, the terminal and the management device both identify an abnormal event occurring in the terminal and take measures for recovery. This configuration enables early detection of a fault and self-recovery by the terminal and even more, detection of a fault that can be detected only by the management device (such as successive use of old firmware or misconfiguration) and automatic recovery or correction Particularly, registering fault analysis conditions, event identification conditions, and recovery processing for abnormal events that are detectable for only either the terminal or the management device as management information enables recovery from various abnormal states. In addition, sending a notification about recovery processing from the terminal to the management device enables prevention of redundant recovery processing.

Hereinafter, embodiments are described with reference to the drawings. The embodiments described herein are not to limit the invention recited in the claims. Not all the elements and the combinations thereof described in the embodiments are indispensable for the solution means of the invention.

In the following description, information may be expressed as, for example, "AAA table"; however, the information can be expressed in any data structures. To imply the independency from the data structure, the "AAA table" can be referred to as "AAA information".

In the following, embodiments regarding the method of fault analysis and recovery of this invention are described with reference to FIGS. 1 to 14. Embodiment 1 is described with FIGS. 1 to 10; Embodiment 2 is described with FIG. 11; and Embodiment 3 is described with FIGS. 12 to 14.

Embodiment 1

Embodiment 1 is a basic embodiment of fault analysis and recovery processing by a terminal and the management device. First, the configurations of a communication system, a terminal, and the management device are described with FIG. 1. Next, table information to be managed by the terminal and the management device is described with FIGS. 2 to 4. Thereafter, fault analysis and recovery processing by the terminal and the management device are described with FIGS. 5 to 8 and examples of screen display for inputting table information and outputting an analysis result of information on failure detection and recovery are described with FIGS. 9 and 10.

With reference to FIG. 1, the configuration of the communication system in Embodiment 1 and the hardware configurations of a terminal and a management device are described. The communication system in FIG. 1 includes one or more terminals (101-a, 101-b, . . . ) to be managed, a management device 102, and a network 150. In the following description, a reference sign 101 without a suffix beginning with "-" is used for a terminal, unless a specific terminal such as 101-a or 101-b is referred to.

The terminals 101 and the management device 102 are connected via the network 150 for wired or wireless communication or both of them; each terminal 101 sends the management device 102 data acquired from its installation site and log information in which information on operation of the terminal is recorded.

The terminal 101 also periodically analyzes the log information to determine whether any abnormal event occurs within the terminal. If detecting an abnormal event, the terminal 101 determines self-recovery processing, sends a notification about the self-recovery processing to the management device 102, and then executes the self-recovery processing.

The management device 102 provides services utilizing data received from the terminals 101 and also, manages faults of the terminals 101. Specifically, the management device 102 periodically analyzes the log information collected from individual terminals 101 to determine whether any abnormal event occurs in any of the terminals 101 and determines recovery processing, if detecting an abnormal event.

Subsequently, the management device 102 determines whether a notification about self-recovery processing is received from the terminal 101 exhibiting a fault and if not, orders the terminal 101 to execute the determined recovery processing.

Although FIG. 1 illustrates a configuration such that one management device 102 has both roles of providing services utilizing received data and managing faults of the terminals 101 by way of example, different configurations are acceptable. For example, the management device 102 can be separated into a management device only for the former role of providing services and another management device only for the latter role of managing faults. The management device 102 can be installed at the same site as the terminals 101 or a different site including a cloud.

The hardware configuration of a terminal 101 is described. As described above, the terminal 101 is to store data acquired from the site and its own log information into packets and send them to the management device 102; it is a computer having a function to communicate with the management device 102.

The terminal 101 can have various configurations depending on the kinds of data to be acquired. For example, in the case where the terminal 101 is not only to aggregate and send data of other apparatuses on the site but also to measure the temperature of the site, it can be a thermometer terminal having a communication function. In the case where the terminal 101 is to take pictures of the site, it can be a camera terminal having a communication function.

The terminal 101 in FIG. 1 includes a communication interface (I/F) 111, a CPU 112, an input unit 113, an output unit 114, and a storage device 115. The communication I/F 111, in the case of wirelessly communicating packets with the management device 102, interconverts a digital signal and a radio signal. It includes a sending unit that converts generated digital data into a radio signal and a receiving unit that takes out digital data from a received radio signal.

In the case where the terminal 101 communicates packets with not only the management device 102 but also other apparatuses on the site or communicates packets with the management device 102 through multiple communication means, the terminal 101 can include a plurality of communication I/Fs 111.

The communication means can be of any kind, such as LTE, Ethernet, WiFi, or optical communication. The CPU 112 executes various computer programs stored in the storage device 115 to perform various functions of the terminal 101.

The input unit 113 can include, for example, a keyboard, a mouse, and/or a touch panel for the operator to input an operation command or settings. The output unit 114 can include a liquid crystal display monitor, for example, to display a configuration window or processing results. Note that the input unit 113 and the output unit 114 are not indispensable when the terminal 101 accepts information input from an external device or provides information to output to an external device via the communication I/F 111, for example, in the case of using remote login from an external device to the terminal 101.

The storage device 115 includes a storage device of a read-only semiconductor memory and a storage device of a rewritable semiconductor memory device, for example, and stores computer programs for performing a variety of processing and acquired data.

An application program 116 manages various settings such as policies for acquiring data and the schedule for sending collected data; the CPU 112 connected via an internal bus performs acquiring data and ordering a communication processing unit 117 to send data. For example, policies for acquiring log information to be sent to the management device 102 and the schedule for sending the log information are also managed by the application program 116.

The application program 116 stores collected log information to a log buffer 300 and sends the log information to the management device 102 at a predetermined time. The log information can include a state of the terminal 101, acquired information such as values measured by sensors connected to the terminal 101, a timestamp, and the identifier of the terminal 101. The application program 116 can function as a log information management unit that collects log information and sends the log information to the management device 102 at a predetermined time.

The communication processing unit 117 is to perform processing to send and receive communications. Specifically, it performs assembling packets to be sent and analyzing incoming packets including determining whether each packet is for the terminal 101.

A self-fault-analysis unit 118 periodically analyzes log information in the log buffer 300 of the terminal 101 to determine whether any abnormal event occurs in the terminal 101. If detecting an abnormal event, the self-fault-analysis unit 118 determines self-recovery processing to be executed and the contents for a notification for the management device 102. The details of the processing of the self-fault-analysis unit 118 will be described later with FIG. 7.

A recovery notification sending unit 119 sends the management device 102 a notification (recovery notification) including the contents determined by the self-fault-analysis unit 118 before executing self-recovery processing for the abnormal event detected by the self-fault-analysis unit 118. Specifically, the recovery notification sending unit 119 outputs the contents for a notification to the communication processing unit 117 to send the notification.

A self-recovery processing unit 120 executes the self-recovery processing determined by the self-fault-analysis unit 118. The self-recovery processing is predetermined processing such as rebooting the communication I/F 111, rebooting the terminal 101, or updating the firmware and it is not limited to specific processing.

A fault analysis condition management unit 121 manages fault analysis conditions defining the rules for analyzing log information. Specifically, it manages a fault analysis condition management table 121a to be described later with FIG. 2.

An event identification condition management unit 122 manages event identification conditions defining which event is to be detected for a combination of fault analysis conditions matching the fault analysis condition management table 121a. Specifically, it manages an event identification condition management table 122a to be described later with FIG. 3.

A recovery processing management unit 123 manages recovery processing to be executed and contents for the notification for the management device 102 for each abnormal event to be detected. Specifically, it manages a recovery processing management table 123a to be described later with FIG. 4.

The terminal 101 can be a stand-alone device or a built-in device. As described above, the terminal 101 can take various configurations depending on the kinds of data to be acquired from the site; for example, it can include a temperature sensor, a camera module, and/or an acceleration sensor.

Each function unit of the communication processing unit 117, the self-fault-analysis unit 118, the recovery notification sending unit 119, the self-recovery processing unit 120, the fault analysis condition management unit 121, the event identification condition management unit 122, and the recovery processing management unit 123 is loaded to the storage device 115 and executed by the CPU 112 as a computer program.

The CPU 112 performs processing in accordance with the programs of function units to work as the function units for providing predetermined functions. For example, the CPU 112 performs processing in accordance with the self-fault-analysis program to function as the self-fault-analysis unit 118. The same applies to the other programs. Furthermore, the CPU 112 works as function units for providing functions of a plurality of processes executed by a program. A computer and a computer system are a device and a system including these function units.

Next, the hardware configuration of the management device 102 is described. The management device 102 includes a communication I/F 131, a CPU 132, an input unit 133, an output unit 134, a storage device 135, a communication processing unit 137, a fault analysis condition management unit 141, an event identification condition management unit 142, and a recovery processing management unit 143; these components are the same as those of the above-described terminal 101.

The input unit 133 and the output unit 134 in FIG. 1 are not indispensable like the ones in the above-described terminal 101, when the management device 102 accepts information input from an external device or provides information to output to an external device via the communication I/F 131, for example, in the case of using remote login from an external device to the management device 102.

An application program 136 is a program for providing a service utilizing data or log information collected from the terminals 101. In the case where the application program 136 is a program for providing an average of data of the site (e.g., temperatures) received from the terminals 101 in a unit time, it performs data analysis such as calculating an average from the collected data values.

Furthermore, in the case where the management device 102 has a program for remotely setting or managing the schedule for the terminals 101 to send data or log information, the program is included in the application program 136. The application program 136 stores log information collected from individual terminals 101 to stored log information 200. Still further, in the case where the management device 102 manages operation schedule information such as a scheduled downtime of the communication system, the program is included in the application program 136. The application program 136 stores the operation schedule information to system operation schedule information 1300 and manages it. In this embodiment, however, storing and managing the operation schedule information is not essential. An embodiment that utilizes the operation schedule information will be described later in Embodiment 3.

A fault analysis unit 138 is the same as the above-described self-fault-analysis unit 118 in each terminal 101, except that the fault analysis unit 138 manages log information collected from individual terminals 101 in the stored log information 200 and analyzes the log information to determine whether any abnormal event occurs in any of the terminals 101.

The fault analysis unit 138 periodically analyzes collected log information in the stored log information 200 to determine whether any abnormal event occurs in any of the terminals 101 and if detecting an abnormal event, determines recovery processing to be executed. The details of the processing of the fault analysis unit 138 will be described later with FIG. 7.

A recovery notification receiving unit 139 manages notifications about self-recovery processing received from the terminals 101. Specifically, when the communication processing unit 137 identifies a received packet as a notification about self-recovery processing as a result of analysis, the communication processing unit 137 notifies the recovery notification receiving unit 139 of the packet and the recovery notification receiving unit 139 records what information is received from which terminal 101.

A recovery order unit 140 orders the terminal 101 causing an abnormal event to execute the recovery processing determined by the fault analysis unit 138. On this occasion, the recovery order unit 140 determines whether to issue the order depending on whether a recovery notification about the self-recovery processing has been received from the specific terminal 101.

If the recovery order unit 140 has not received a notification about the self-recovery processing from the terminal 101 exhibiting a fault, it sends an order to execute recovery processing (hereinafter, a recovery order) to the terminal 101. Specifically, the recovery order unit 140 instructs the communication processing unit 137 to send the recovery order to the terminal 101.

Contrarily, if the recovery order unit 140 has received the notification from the terminal exhibiting a fault, it cancels and discards the recovery order to avoid redundant recovery processing. The details of this processing will be described later with FIG. 8.

As to the management device 102, the elements in FIG. 1 can all be included in a single management device 102 or separately included in a plurality of management devices 102, as described above. Accordingly, including all elements shown in FIG. 1 in a single management device 102 is not essential.

With reference to FIG. 2, the fault analysis condition management table 121a to be managed by the fault analysis condition management unit 121 of each terminal 101 and the fault analysis condition management table 141a to be managed by the fault analysis condition management unit 141 of the management device 102 are described.

The fault analysis condition management tables 121a and 141a are to manage fault analysis conditions defining the rules for analyzing various kinds of log information of a terminal 101; FIG. 2 is a configuration diagram of a fault analysis condition management table in Embodiment 1.

An analysis condition ID 201 indicates the identifier of a fault analysis condition, which is uniquely assigned to the fault analysis condition. The identifier in this field can be expressed in any form. For example, it can be expressed by a character string to express the kind of log information to be analyzed as shown in FIG. 2 or a sequential number such as No. 1, No. 2, . . .

Reference information 202 indicates the kind of log information to be analyzed under the fault analysis condition out of the log information of a terminal 101. The kind of log information in FIG. 2 is expressed in the form of human-interpretable character string such as "LTE connection state", but it can be expressed in any form. For example, if individual kinds of log information of a terminal 101 are stored in different registers of the terminal 101 and each register value can represent a kind of log information, the register value can be included in the reference information 202.

A comparison policy 203 indicates whether to use the value in the later-described threshold value 205 as an "absolute value" or "relative value" (difference) with respect to the previous value in comparing log information with the threshold value 205. Taking an example of the fault analysis condition registered in the row of the fault analysis condition ID of "CpuRatio" in the fault analysis condition management table in FIG. 2, if the comparison policy 203 is "absolute value", the analysis determines whether the current CPU ratio of the terminal 101 is 95% (0.95) or more and if "relative value", the analysis determines whether the current CPU ratio is increased by 95% or more of the previous value.

As understood from the above, various fault analysis conditions can be defined flexibly by specifying an appropriate comparison policy in each comparison policy 203. Although FIG. 2 provides two patterns of "absolute value" and "relative value" as examples of choices for a comparison policy 203, any comparison policies such as "average", "highest value", and "lowest value" of the previous N records (N is an integer greater than 1).

A comparison condition 204 indicates a comparison condition specifying a magnitude relation with respect to the later-described threshold value 205.

Specifically, it is a field to register a comparative operator such as "=", "≥", ">", "<", "≤", or "≠". Instead of a comparative operator, it can be expressed by a character string defining a magnitude relation, such as "equal" or "higher".

A threshold value 205 indicates a comparative criterion for the log information specified in the reference information 202. The threshold value 205 can be expressed by not only a numerical value but also a character string. For example, in order to express the "LTE connection state" of a terminal 101 by a character string of "disconnected" or "connected" instead of a numerical value of "0" or "1" as shown in FIG. 2, a character string "Disconnected" or "Connected" is to be specified for the threshold value 205.

In many cases of registering a character string in the threshold value 205, the comparative operator to be registered in the comparison condition 204 is to be either "=(equal)" or "#(not equal)"; however, desirable comparison conditions such as "left-hand match" and "right-hand match" can be added to the choices.

A number of times of match 206 indicates how many consecutive times log information of the kind specified in the reference information 202 should satisfy the analysis condition specified by the comparison policy 203, the comparison condition 204, and the threshold value 205 to be regarded as a match with the condition.

For example, so as not to excessively detect an anomaly in response to merely momentary disconnection from LTE, specifying "3" in the number of times of match 206 as shown in the row of the fault analysis condition ID "LteState" in FIG. 2 will work.

In this case, a match with the fault analysis condition of the ID "LteState" will not be detected unless the "LTE connection state" is determined to be "0 (disconnected)" three consecutive times or more; accordingly, detection of an anomaly in response to a certain period of disconnection from LTE becomes available.

Although the fault analysis condition management table is managed by each of the terminals 101 and the management device 102, the registered fault analysis conditions can be different between the tables 121a of the terminals 101 and the table 141a of the management device 102. For example, the row including a fault analysis condition ID of "FirmVer" in the table shown in FIG. 2 provides a fault analysis condition to determine whether the firmware version number applied to the terminal 101 is smaller than 14.01 but information on the latest firmware version is usually managed only by the management device 102.

When the firmware is updated, the management device 102 can update the value of the threshold value 205 from "14.01" to "15.00", for example. For the terminals 101, however, it is difficult to update the fault analysis management table 121a like the management device 102 does, unless explicitly instructed by the management device 102.

For this reason, the fault analysis condition having the fault analysis condition ID of "FirmVer" can be registered only in the fault analysis condition management unit 141 of the management device 102 and not in the terminals 101. Then, the terminals 101 can reduce the load of fault analysis processing. Furthermore, different values can be specified for the threshold value 205 or the number of times of match 206 for the same kind of log information between the tables for the terminals 101 and the table for the management device 102.

For example, assume that an anomaly should be detected when a terminal 101 is disconnected from LTE for over three minutes. When the cycle of the self-analysis by the self-fault-analysis unit 118 of each terminal 101 is one minute and the cycle of the analysis by the fault analysis unit 138 of the management device 102 is one minute and thirty seconds, the number of times of match 206 for the fault analysis ID "LteState" can be specified as "3" (=3 minutes+1 minute) for the tables of the terminals 101 and "2" (=3 minutes=1 minute and 30 seconds) for the table of the management device 102.

As understood from the above, defining appropriate fault analysis conditions uniquely to the fault analysis condition management table 121a to be managed by each terminal 101 and the fault analysis condition management table 141a to be managed by the management device 102 enables flexible detection of an anomaly occurring in a terminal 101. Especially, registering fault analysis conditions for the anomalies that can be detected only by either the terminal 101 or the management device 102 enables detection of various faults or anomalies.

With reference to FIG. 3, the event identification condition management table 122a to be managed by the event identification condition management unit 122 of each terminal 101 and the event identification condition management table 142a to be managed by the event identification condition management unit 142 of the management device 102 are described.

The event identification condition management tables 122a and 142a are to manage event identification conditions defining which event is to be detected as an abnormal event based on the match determination results on individual fault analysis conditions. FIG. 3 is a configuration diagram of the event identification condition management table 122a or 142a in Embodiment 1.

An event ID 301 indicates the identifier for identifying the kind of an abnormal event to be detected and it is unique to the event. The policy of naming the identifier is not limited. Although the examples in FIG. 3 uses expressions whose readability is prioritized (e.g., "LteDisconn (disconnected from LTE)"), the identifiers can be sequential numbers such as "event01", "event02", . . .

A match condition (1) 302, a match condition (2) 303, and a match condition (3) 304 indicate the identifiers of fault analysis conditions to be satisfied in detecting an abnormal event specified in the event ID 301.

In these fields, identifiers in the analysis condition IDs 201 of the fault analysis condition management table 121a or 141a in FIG. 2 are registered. As indicated in the row of the event ID "LackRxCapability (Lack of receiving capability caused by load up) in FIG. 3, a plurality of fault analysis condition IDs can be specified for one event.

In this case, the abnormal event is detected only when all these fault analysis conditions are satisfied. According to the example in FIG. 3, the "Lack of receiving capability caused by load up" of a terminal 101 is detected as an abnormal event when the fault analysis condition IDs of "CpuRatio" (three consecutive times of detection of 95% or more CPU ratio) and "PacketDrop" (three consecutive times of increase in the number of packet drops by over 300 packets) are both satisfied.

In order to detect a plurality of abnormal events in response to a match with a single fault analysis condition, its fault analysis condition ID is to be registered for the plurality of abnormal events. Allowing registration of one or more fault analysis condition IDs for each abnormal event enables detection of complicated and various abnormal events. Although the example of FIG. 3 has three match condition fields of the match condition (1) to the match condition (3), the number of fields can be changed desirably.

Although the event identification condition management table is managed by each of the terminals 101 and the management device 102, the registered event identification conditions can be different between the tables 122a of the terminals 101 and the table 142a of the management device 102.

For example, taking an aforementioned case where it is difficult for a terminal 101 to detect that the firmware applied to the terminal 101 is of an old version by itself, the event identification condition having the event ID of "OldFirm (old firmware in use) in FIG. 3 can be registered only in the event identification condition management unit 142 of the management device 102 and not registered in the terminal 101.

With reference to FIG. 4, the recovery processing management table 123a to be managed by the recovery processing management unit 123 of each terminal 101 and the recovery processing management table 143a to be managed by the recovery processing management unit 143 of the management device 102 are described. The recovery processing management tables 123a and 143a are to manage recovery processing to be executed for each abnormal event; FIG. 4 is a configuration diagram of the recovery processing management table 123a or 143a in Embodiment 1.

An event ID 401 indicates the identifier for identifying the kind of an abnormal event. It is the same as the event ID 301 in the event identification condition management table in FIG. 3; its form of expression conforms with that of the event ID 301 in FIG. 3.

A notification message 402 indicates the contents of the notification to be sent from a terminal 101 to the management device 102 when the terminal 101 detects an abnormal event of the event ID 401. Although the example of FIG. 4 is configured to send a combination of a character string indicating recovery processing (e.g., LteReboot (Rebooting the communication I/F for LTE) and the ID of the detected event (e.g., LteDisconn (Disconnected from LTE), the message can be expressed in any form.

However, it is desirable that the message be in a form for the management device 102 in receipt of the notification to be able to identify which self-recovery processing is to be executed or what kind of abnormal event has been detected by the terminal 101 of the sender. The field of the notification message 402 can be blank or excluded in the recovery processing management table to be managed by the management device 102.

A recovery measure 403 indicates recovery processing to be executed when the terminal 101 or the management device 102 detects an abnormal event identified by the event ID 401. In the case where a terminal 101 detects an abnormal event identified by the event ID 401, the terminal 101 performs the self-recovery processing registered in the recovery measure 403 with the self-recovery processing unit 120.

In the case where the management device 102 detects an abnormal event, the management device 102 sends an order to execute the recovery processing registered in the recovery measure 403 to the pertinent terminal 101 with the recovery order unit 140. Although the examples of recovery processing in FIG. 4 are expressed in a form whose readability is prioritized (e.g., "Reboot communication I/F (LTE)"), the recovery measures 403 can be expressed in any form, as far as the recovery processing can be identified.

For example, the command necessary to execute recovery processing can be directly written to the recovery measure 403. Furthermore, a recovery measure 403 can include a plurality of kinds of recovery processing together with additional information such as the order of execution as necessary, if a plurality of kinds of recovery processing need to be executed, although the examples in FIG. 4 include only one kind of recovery processing for one abnormal event.

A waiting time 404 indicates the waiting time until execution of the recovery processing specified in the recovery measure 403 when an abnormal event identified by the event ID 401 is detected. In the case where a terminal 101 detects an abnormal event identified by an event ID 401, the terminal 101 stands by for the time specified in the waiting time 404 after detecting the abnormal event and executes the self-recovery processing specified in the recovery measure 403.

In the case where the management device 102 detects an abnormal event, the management device 102 stands by for the time specified in the waiting time 404 after detecting the abnormal event and sends the terminal 101 an order to execute the recovery processing specified in the recovery measure 403 with the recovery order unit 140.

For example, when a terminal 101 executes recovery processing by rebooting itself, data collection from other apparatuses on the site may be interrupted. Like this case, inconvenient cases are expected if recovery processing that causes a system halt is executed immediately after detection of an abnormal event.

For such a case, setting an appropriate waiting time for executing the recovery processing to the waiting time 404 can provide a window time that allows preparation for the system halt. Needless to say, the waiting time 404 can be "0 minute" if the recovery processing should be executed immediately after detection of an abnormal event. Although the examples of the waiting time 404 in FIG. 4 are specified in unit of minute, the unit of time can be changed desirably.

Although the recovery processing management table is managed by each of the terminals 101 and the management device 102, the registered information can be different between the tables 123a of the terminals 101 and the table 143a of the management device 102. For example, the value of a waiting time 404 for the management device 102 can be specified longer than the that for the terminals 101.

As a result, the management device 102 is provided with a long window time between detection of an abnormal event and sending out a recovery order; the management device 102 can wait a notification about self-recovery processing from a terminal 101 for a longer time, reducing the probability of execution of redundant recovery processing.

Furthermore, a desirable field can be added to the examples of fields shown in FIG. 4. For example, a field of priority ranking can be added to clarify the recovery processing to be executed sooner in case where multiple abnormal events are detected simultaneously.

The fault analysis condition management tables 121a and 141a in FIG. 2, the event identification condition management tables 122a and 142a in FIG. 3, and the recovery processing management tables 123a and 143a in FIG. 4 can be not only configured during the system construction but also configured or altered at any time when the system is in operation. An example of screen display for configuring or altering these tables will be described later with FIG. 9.

Although this embodiment provides the event identification management tables 122a and 142a in FIG. 3 separately from the recovery processing management tables 123a and 143a in FIG. 4, these two kinds of tables can be integrated to manage the identification condition and the recovery processing for each abnormal event with a single table.

In this case, integration of the event identification condition management unit 122 with the recovery processing management unit 123 in each terminal 101 and integration of the event identification condition management unit 142 with the recovery processing management unit 143 in the management device 102 are also available.

Figure 5:
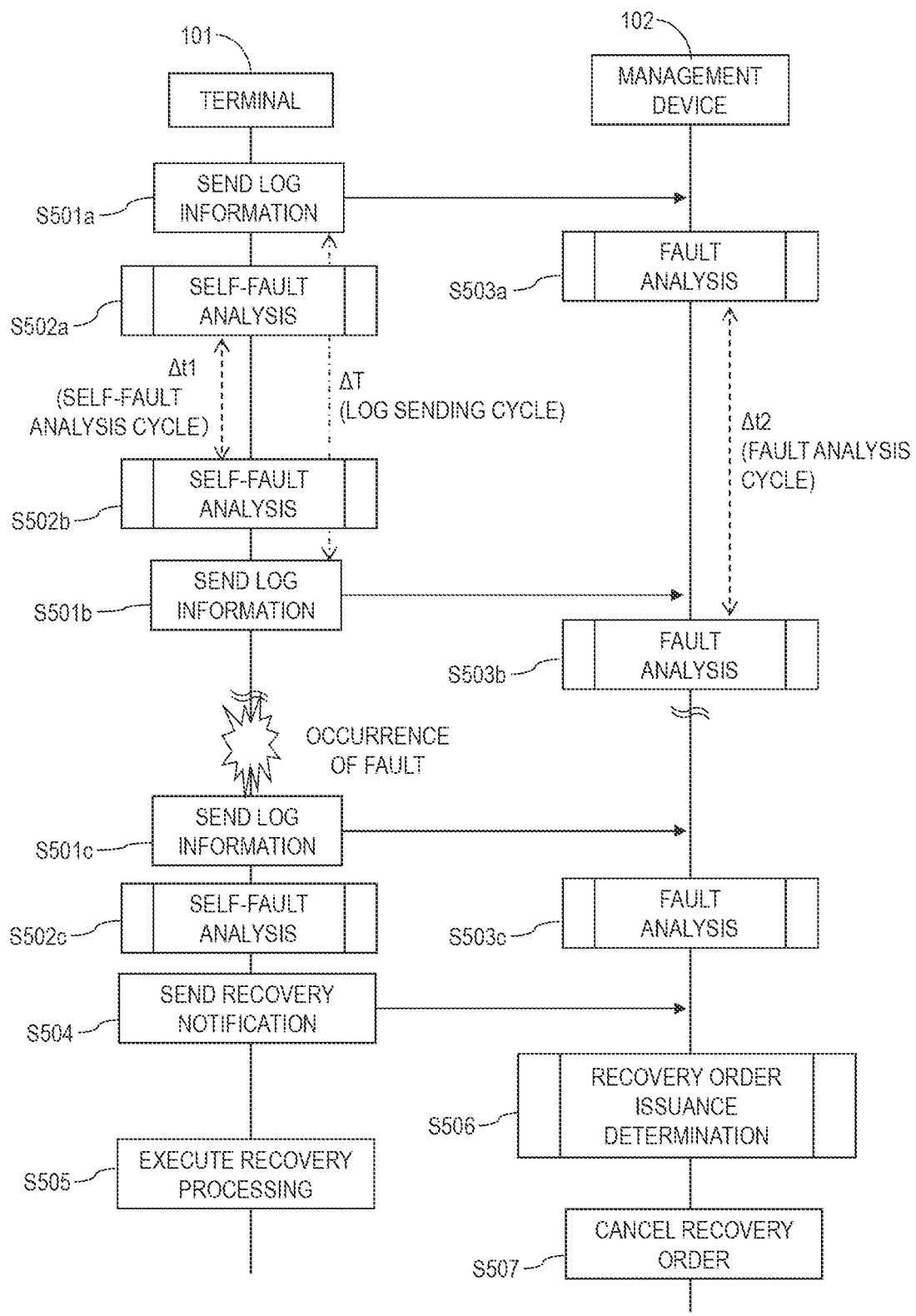
FIG. 5 is a sequence diagram illustrating a flow of fault analysis and recovery by the management device and a terminal in Embodiment 1; particularly, an example of self-recovery by the terminal.

With reference to FIG. 5, a flow of fault analysis and recovery processing to be performed by a terminal 101 and the management device 102 is described. FIG. 5 illustrates an example of a case where recovery from a fault is achieved by the terminal 101 through its self-fault-analysis and self-recovery processing. The details are described as follows.

Steps S501a, S501b, and S501c in FIG. 5 are processing for the terminal 101 to send various kinds of log information to the management device 102. The kinds of the log information to be sent should include at least the log information specified in the reference information 202 in the fault analysis condition management table in FIG. 2. The terminal 101 can also send log information not specified in the reference information 202.

The terminal 101 acquires its own log information in accordance with the policies managed by the application program 116, temporarily stores it to the log buffer 300, and sends the log information to the management device 102 with the communication processing unit 117 in accordance with the sending schedule that is also managed by the application program 116.

If the application program 116 specifies that log information is to be sent with time intervals of a specific log sending cycle $\Delta T$ as shown in FIG. 5 by way of example, the application program 116 sends log information at Step S501a and again at Step S501b when the log sending cycle $\Delta T$ has elapsed.

Steps S502a, S502b, and S502c are processing for the terminal 101 to analyze its own log information to determine whether any abnormal event occurs in the terminal 101 with its self-fault-analysis unit 118 and if detecting an abnormal event, determine the self-recovery processing to be executed and the contents for the notification for the management device 102.

The details of the self-fault-analysis processing of Steps S502a, S502b, and S502c will be described later with FIG. 7. When to execute the self-fault-analysis processing of Steps S502a, S502b, and S502c is managed by the self-fault-analysis unit 118 of the terminal 101; for example, the self-fault-analysis unit 118 executes the processing with time intervals of a specific self-fault-analysis cycle $\Delta t1$ as shown in FIG. 5 by way of example.

If detecting no abnormal event in the self-fault-analysis processing (e.g., Steps S502a and S502b), the self-fault-analysis unit 118 executes the self-fault-analysis processing again when one self-fault-analysis cycle $\Delta t1$ has elapsed. If detecting an abnormal event (e.g., Step S502c), the self-fault-analysis unit 118 determines the contents for the notification for the management device 102 and the self-recovery processing to be executed within the step and executes the processing of Steps S504 and S505, which will be described later.

Steps S503a, S503b, and S503c are processing for the fault analysis unit 138 of the management device 102 to analyze log information in the stored log information 200 collected from terminals 101, determine whether any abnormal event occurs in any of the terminals 101, and if detecting an abnormal event, determine the recovery processing to be ordered to the pertinent terminal 101.

The details of the fault analysis processing of Steps S503a to 503c will also be described later with FIG. 7. When to execute the fault analysis processing of Steps S503a to 503c is to be managed by the fault analysis unit 138 of the management device 102; for example, the fault analysis unit 138 executes the processing with time intervals of a specific fault analysis cycle Δt2 as shown in FIG. 5 by way of example.

If detecting no abnormal event in the fault analysis processing (e.g., Steps S503a and S503b), the fault analysis unit 138 executes the fault analysis processing again when one fault analysis cycle Δt2 has elapsed. If detecting an abnormal event (e.g., Step S503c), the fault analysis unit 138 executes the processing of Step S506 to be described later.

As shown in the examples in FIG. 5, the log sending cycle ΔT for Step S501 to be executed by the terminal 101, the self-fault-analysis cycle Δt1 for Step S502 to be executed by the terminal 101, and the fault analysis cycle Δt2 for Step S503 to be executed by the management device 102 can have different time length.

Especially in the case where the communication band between the terminal 101 and the management device 102 is narrow or communication fee is charged to send log information, the log sending cycle ΔT needs to be long. Collaterally, the fault analysis cycle Δt2 for the management device 102 may also need to be long.

However, the self-fault-analysis cycle Δt1 for the terminal 101 can be short regardless of the communication bandwidth or communication fee. Setting a shorter self-fault-analysis cycle Δt1 reduces the time from occurrence of a fault to detection of it, compared to the configuration where only the management device 102 performs fault analysis processing.

Although FIG. 5 provides only a configuration that executes Steps S501a to S503c with a constant cycle for convenience of explanation, these steps can be executed at specified hours. For example, configuring so that the management device 102 executes fault analysis processing at 12:00 p.m. and 6:00 p.m. every day is available; the execution schedule for Steps S501a to 503c can be configured desirably.

Step S504 is processing for the recovery notification sending unit 119 of the terminal 101 to send a notification about self-recovery processing to the management device 102. This notification includes the contents determined when the self-fault-analysis unit 118 has detected an abnormal event at Step S502c, specifically, the contents stored in the notification message 402 in the recovery processing management table in FIG. 4 managed by the recovery processing management unit 123.

In this processing, the recovery notification sending unit 119 notifies the communication processing unit 117 of the contents to send packets storing the contents to the management device 102. When the management device 102 receives the notification, the communication processing unit 137 of the management device 102 analyzes the packets and notifies the recovery notification receiving unit 139 of the contents of the notification such as which terminal 101 has sent the notification, which kind of abnormal event is detected, and/or what kind of recovery processing is to be executed to record the contents of the notification.

The recovery notification sending processing of Step S504 is executed after an abnormal event is detected at Step S502c. In this connection, the recovery notification sending unit 119 can be configured to send the recovery notification either as soon as the abnormal event is detected or just before the self-recovery processing of Step S505 (which will be described later) is executed after suspending (delaying) sending the notification for the time specified in the waiting time 404 of the recovery processing management table in FIG. 4.

Step S505 is processing for the self-recovery processing unit 120 of the terminal 101 to execute the self-recovery processing determined at Step S502c where the abnormal event is detected. Specifically, the self-recovery processing unit 120 executes the recovery processing specified in the recovery measure 402 in the recovery processing management table 123a in FIG. 4 managed by the recovery processing management unit 123.

The self-recovery processing unit 120 executes the recovery processing when the waiting time specified in the waiting time 404 in the recovery processing management table 123a has elapsed since the abnormal event is detected at Step S502c. Through this processing, the terminal 101 can recover from the detected abnormal event by itself.

Step S506 is processing for the recovery order unit 140 of the management device 102 to determine whether to issue an order to execute the recovery processing determined at Step S503c to the terminal 101 causing the abnormal event.

The recovery order processing is executed when the time specified in the waiting time 404 in the recovery processing management table 143a in FIG. 4 has elapsed since the abnormal event is detected at Step S503c.

In this recovery order processing, the recovery order unit 140 determines whether the recovery notification described in Step S504 has been received from the terminal 101 with the recovery notification receiving unit 139 and if in receipt, proceeds to Step S507 to be described later and cancels the recovery order.

If the recovery notification has not been received, the recovery order unit 140 proceeds to Step S601 to be described later with FIG. 6 and notifies the communication processing unit 137 of the contents for the recovery order to send the recovery order to the terminal 101. The details of this processing will be described later with FIG. 8. In the example of FIG. 5, the recovery notification has been received from the terminal 101 at Step S504 and therefore, the recovery order unit 140 proceeds to Step S507.

Step S507 is processing for the recovery order unit 140 of the management device 102 to cancel the order to execute the recovery processing determined at Step S503c. If a recovery notification of Step S504 has been received from the terminal 101 causing the abnormal event, self-recovery processing has been executed by the terminal 101 without an order from the management device 102 and therefore, the recovery order should not be sent from the management device 102 redundantly. The recovery order unit 140 canceling the recovery order at this Step S507 enables the terminal 101 to recover from the abnormal event without executing redundant recovery processing.

Although the example of FIG. 5 is configured so that the terminal 101 executes Step S505 of self-recovery processing after Step S504 of sending a recovery notification, the order of these steps can be inverted. However, sending a recovery notification to the management device 102 at an earlier occasion before executing self-recovery processing increases the probability that the management device 102 can cancel the order for redundant recovery processing and improves the efficiency.

Figure 6:
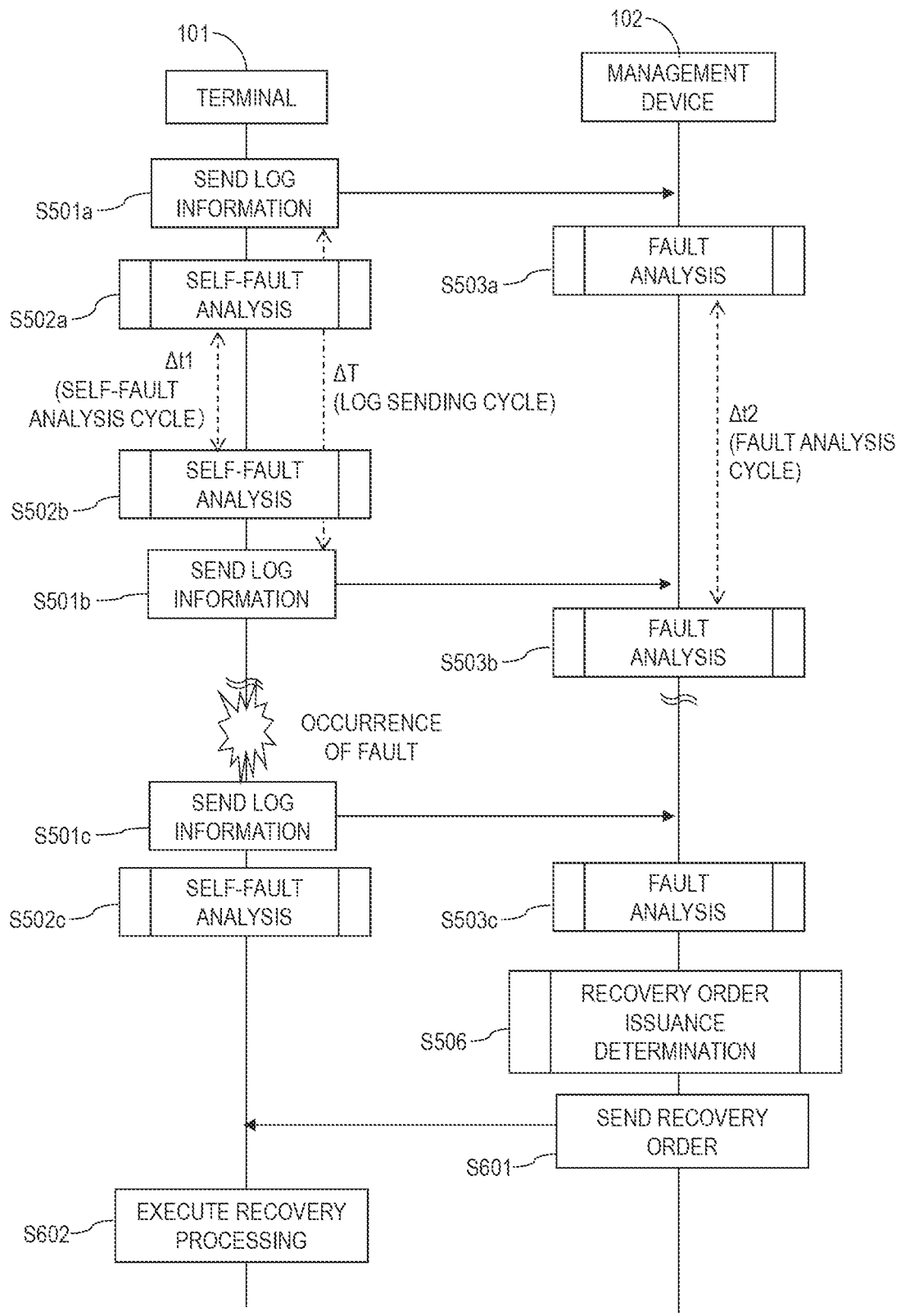
FIG. 6 is a sequence diagram illustrating a flow of fault analysis and recovery by the management device and a terminal in Embodiment 1; particularly, an example of a recovery order by the management device.

Next, with reference to FIG. 6, an example of the case where the terminal 101 recovers from a fault through fault analysis and recovery order processing by the management device 102 is also described. The details are described as follows.

Steps S501a to S501c, Steps 502a to 502c, Steps S503a to S503c, and Step 506 in FIG. 6 are the same as those in FIG. 5 and therefore, description of these is skipped.

In the example of FIG. 6, a recovery notification is not sent from the terminal 101 between Step S503c where the fault analysis unit 138 detects an abnormal event in the terminal 101 and Step S506 where the fault analysis unit 138 determines whether to issue a recovery order. Because of the non-receipt of the notification, the management device 102 proceeds to Step S601.

Step S601 is processing for the recovery order unit 140 of the management device 102 to order the terminal 101 exhibiting an abnormal event to execute the recovery processing determined at Step S503c. Specifically, the recovery order unit 140 notifies the communication processing unit 137 of the recovery processing to send packets storing information on the recovery processing to be executed to the terminal 101.

Step S602 is processing for the terminal 101 that has received the recovery order sent at Step S601 to execute the recovery processing specified by the management device 102 with the self-recovery processing unit 120. Specifically, when the terminal 101 receives the recovery order from the management device 102, the communication processing unit 117 analyzes the packets and informs the self-recovery processing unit 120 of the recovery processing to be executed and the self-recovery processing unit 120 executes the recovery processing. As a result, the terminal 101 recovers from its abnormal event.

Like this case, if the terminal 101 does not detect an abnormal event by itself and the management device 102 does, the management device 102 sends a recovery order in response to non-execution of Step S504 in FIG. 5 where the terminal 101 sends a recovery notification to the management device 102.

This configuration enables the terminal 101 to execute recovery or correction processing for an abnormal event that is difficult to detect for the terminal 101, such as aforementioned continuous use of old firmware.

Even in the case of an abnormal event detectable by the terminal 101, if the management device 102 detects the event earlier than the terminal 101, the management device 102 sends a recovery order as illustrated in FIG. 6. As a result, early fault recovery is achieved, compared to the configuration such that only the terminal 101 performs fault analysis.

Figure 7:
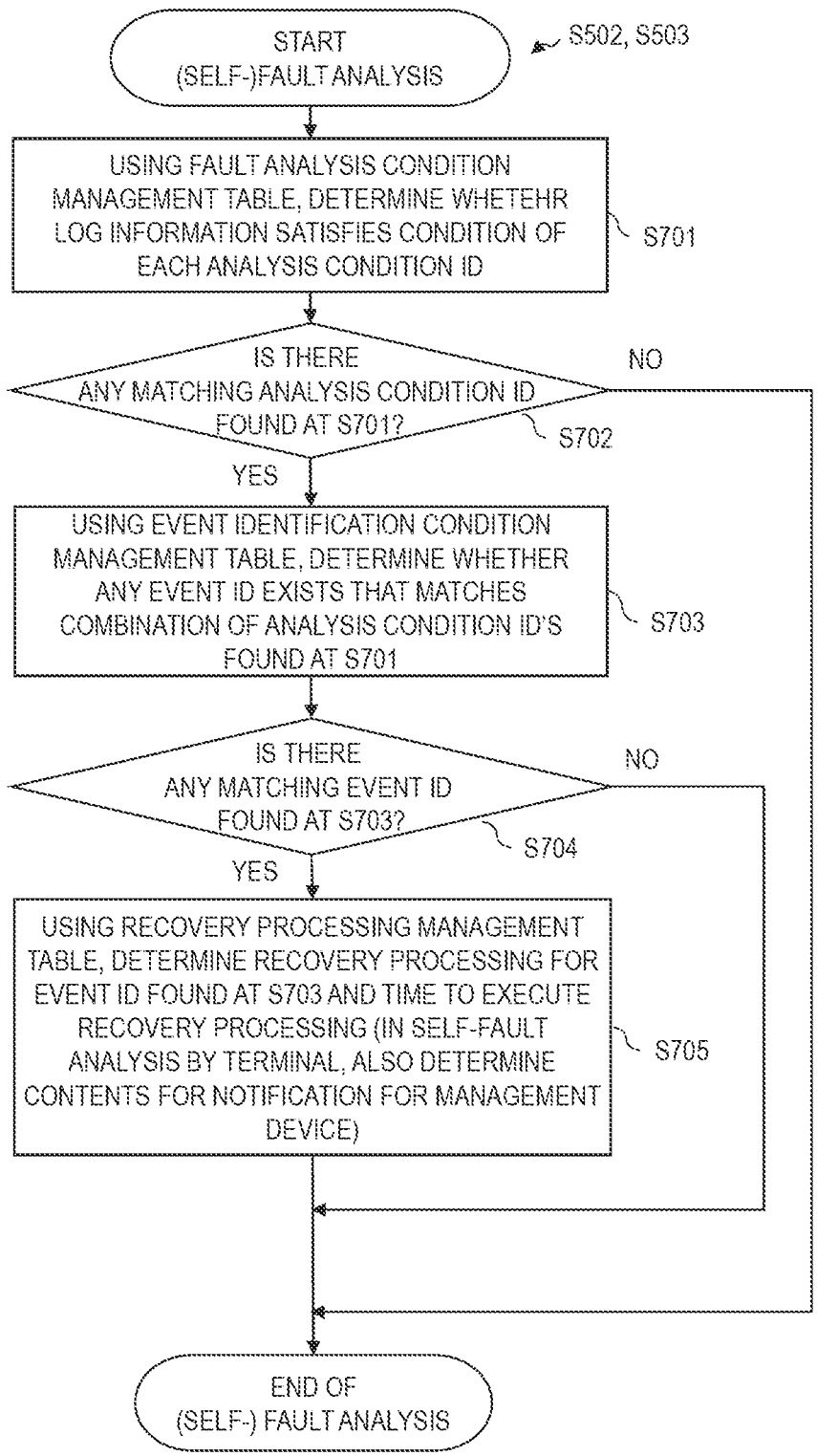
FIG. 7 is a flowchart of an example of fault analysis processing of the management device and self-fault-analysis processing of a terminal in Embodiment 1.

With reference to FIG. 7, self-fault-analysis processing to be performed by the self-fault-analysis unit 118 of a terminal 101 and fault analysis processing to be performed by the fault analysis unit 138 of the management device 102 are described. Specifically, they correspond to the processing performed at Steps S502a to S502c and S503a to S503c in FIGS. 5 and 6.

In this processing, the terminal 101 or the management device 102 analyzes log information of the terminal 101 to determine whether any abnormal event occurs and if detecting an abnormal event, determines the recovery processing to be executed. In the case of the self-fault-analysis processing by the self-fault-analysis unit 118 of the terminal 101, this processing includes determining the contents of the recovery notification to be sent to the management device 102.

FIG. 7 is a flowchart of the self-fault-analysis processing of a terminal 101 and the fault analysis processing of the management device 102 in Embodiment 1; the details are described as follows. The management device 102 performs this processing on the unprocessed log information in the stored log information 200 and the terminal 101 performs this processing on the unprocessed log information in the log buffer 300.

Step S701 in FIG. 7 is processing for the fault analysis unit 138 (self-fault-analysis unit 118) to analyze log information of the terminal 101 with respect to each analysis condition ID 201 in the fault analysis condition management table 141a (121a) in FIG. 2 and determine whether any abnormal event occurs.

Although FIG. 2 provides disconnection from LTE (a wireless network), increase in CPU ratio, increase in packet drop, and a wrong version of the firmware as examples of abnormal events, the kinds of abnormal events are not limited to these. The kinds of abnormal event can be changed as appropriate depending on the data to be handled by the terminal 101 or sensors.

In the case of the self-fault-analysis processing by the terminal 101, the self-fault-analysis unit 118 analyzes own log information of the terminal 101 with reference to the fault analysis condition management table 121a managed by the fault analysis condition management unit 121.

In the other case of the fault analysis processing by the management device 102, the fault analysis unit 138 analyzes the log information collected from each terminal 101 with reference to the fault analysis condition management table 141a managed by the fault analysis condition management unit 141.

When the analysis is complete on all fault analysis conditions registered in the fault analysis condition management table 141a (121a), the fault analysis unit 138 (self-fault-analysis unit 118) records the analysis condition ID (the analysis condition ID 201 in FIG. 2) of the satisfied fault analysis conditions, if any. For example, if the log information of a terminal 101 indicates that the "LTE connection state" is "0 (disconnected)" for three consecutive times in the past, the analysis condition ID "LteState" is recorded to the storage device 135 (115), in the case of using the table in FIG. 2. After completion of Step S701, the fault analysis unit 138 (self-fault-analysis unit 118) proceeds to Step S702.

Step S702 is processing for the fault analysis unit 138 (self-fault-analysis unit 118) to determine whether any analysis condition ID of a fault analysis condition satisfied by the log information found in the processing of Step S701 exists.

If at least one matching analysis condition ID exists (YES) like the aforementioned example where the analysis condition ID "LteState" is a match, the fault analysis unit 138 (self-fault-analysis unit 118) proceeds to Step S703. If no matching analysis condition ID exists (NO), it is obvious that no abnormal event to be detected exists and accordingly, the fault analysis unit 138 (self-fault-analysis unit 118) terminates the processing of FIG. 7.

Step S703 is processing for the fault analysis unit 138 (self-fault-analysis unit 118) to identify the abnormal event occurring in the terminal 101 by consulting the event identification condition management table 142a (122a) in FIG. 3 with the combination of the matching analysis condition IDs found at Step S701.

In the case of the self-fault-analysis processing by the terminal 101, the self-fault-analysis unit 118 performs the identification with reference to the event identification management table 122a managed by the event identification condition management unit 122.

In the other case of the fault analysis processing by the management device 102, the fault analysis unit 138 performs the identification with reference to the event identification management table 142a managed by the event identification condition management unit 142.

If a matching abnormal event exists, the fault analysis unit 138 (self-fault-analysis unit 118) records its event ID (the event ID 301 in FIG. 3) to the storage device 135 (115).

Taking the aforementioned example where the condition of the analysis condition ID "LteState" is satisfied, the event ID of "LteDisconn (Disconnected from LTE)" is a match, in the case of using the table in FIG. 3; the fault analysis unit 138 (self-fault-analysis unit 118) detects the abnormal event "Disconnected from LTE" in the terminal 101 and records the event ID. After completion of Step S703, the fault analysis unit 138 (self-fault-analysis unit 118) proceeds to Step S704.

Step S704 is processing for the fault analysis unit 138 (self-fault-analysis unit 118) to determine whether any matching event ID 301 has been found in the processing of Step S703. If at least one matching event ID 301 exists (YES) like the above-described example where the event ID of "LteDisconn (Disconnected from LTE)" is a match, the fault analysis unit 138 (self-fault-analysis unit 118) proceeds to Step S705. If no matching event ID exists (NO), the fault analysis unit 138 (self-fault-analysis unit 118) determines that no abnormal event occurs in the terminal 101 and terminates the processing of FIG. 7.

Step S705 is processing for the recovery order unit 140 (self-recovery processing unit 120) to determine the recovery processing (recovery measure 403) for the event ID 301 found at Step S703 together with when to execute the recovery processing with reference to the recovery processing management table 143a (123a) in FIG. 4.

The recovery order unit 140 (self-recovery processing unit 120) determines the recovery processing to be executed for the event ID 301 found at Step S703 and how much waiting time is necessary to order (execute) the recovery processing with reference to the fields of the recovery measure 403 and the waiting time 404 in the recovery processing management table 143a (123a) in FIG. 4.

For example, in the above-described case where the event ID of "LteDisconn (Disconnected from LTE)" is a match, the recovery order unit 140 (self-recovery processing unit 120) can determine to order (execute) "Rebooting communication I/F for LTE" "5 minutes" later, in the case of using the table in FIG. 4.

In the case of the self-fault-analysis processing by the self-fault-analysis unit 118 of the terminal 101, the self-recovery processing unit 120 executes Step S705 with reference to the recovery processing management table 123a managed by the recovery processing management unit 123. Further, the self-recovery processing unit 120 determines the contents of the notification to be sent to the management device 102 with reference to the field of the notification message 402 in the recovery processing management table 123a.

The contents of the notification determined in this processing are sent to the management device 102 in the recovery notification sending processing of Step S504 in FIG. 5 and the recovery processing is executed at Step S505 in FIG. 5 when the specified waiting time has elapsed.

In the other case of the fault analysis processing by the fault analysis unit 138 of the management device 102, the fault analysis unit 138 executes processing of Step S705 with reference to the recovery processing management table 143a managed by the recovery processing management unit 143.

After the specified waiting time has elapsed, the recovery order unit 140 executes recovery order issuance determination processing of Step S506 in FIGS. 5 and 6 and if determining to issue a recovery order, the recovery order unit 140 sends an order to execute the recovery processing at Step S601 of FIG. 6. Upon completion of the processing of Step S705, the fault analysis unit 138 terminates the processing of FIG. 7.

Through the above-described processing of FIG. 7, the terminal 101 and the management device 102 can determine whether an abnormal event occurs in the terminal 101 and if detecting an abnormal event, determine the recovery processing to be executed and when to execute the recovery processing.

Figure 8:
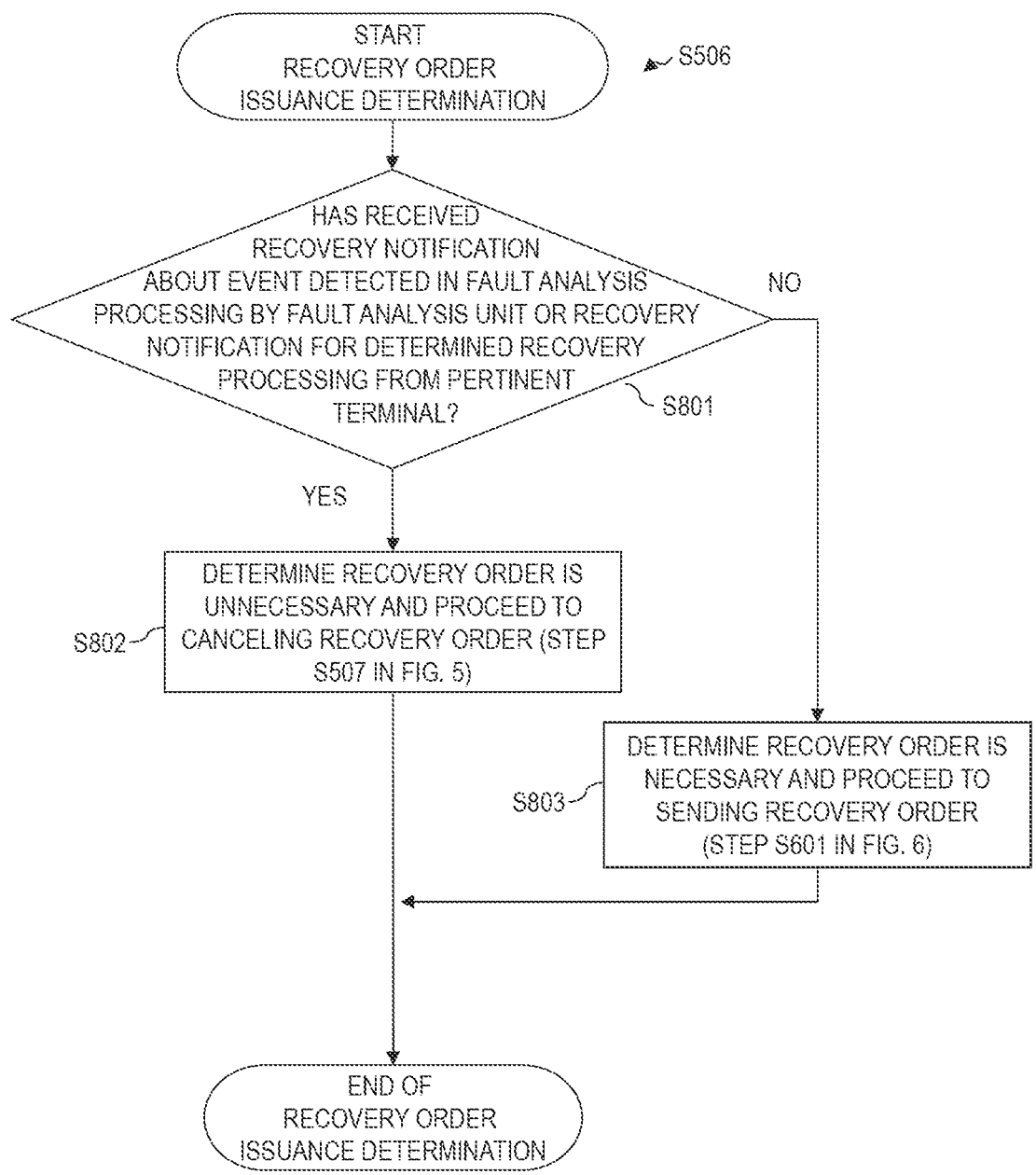
FIG. 8 is a flowchart of an example of recovery order issuance determination processing of the management device in Embodiment 1.

With reference to FIG. 8, recovery order issuance determination processing to be performed by the recovery order unit 140 of the management device 102 is described. Specifically, this processing corresponds to Step S506 in FIGS. 5 and 6.

This processing is to determine whether to send an order about the recovery processing determined by the management device 102 in the fault analysis processing in FIG. 7 depending on whether a recovery notification is received from the terminal 101. FIG. 8 is a flowchart of the recovery order issuance determination processing of the management device 102 in Embodiment 1; the details are described as follows.

Step S801 is processing for the recovery order unit 140 of the management device 102 to determine whether a recovery notification has been received from the terminal 101 where to send the recovery order with reference to the recovery notification receiving unit 139.

Specifically, the recovery order unit 140 determines whether a recovery notification has been received from the terminal 101 exhibiting the abnormal event detected in the fault analysis processing in FIG. 7 and if the notification is about the abnormal event detected in the fault analysis processing in FIG. 7 or the recovery processing determined in the fault analysis processing in FIG. 7, the recovery order unit 140 determines that the notification has been received.

For example, assume that the fault analysis unit 138 has detected an abnormal event of the event ID "LteDisconn (Disconnected from LTE)" from a terminal 101 and determined to execute recovery processing of "Rebooting communication I/F for LTE" through its fault analysis processing, like the example described with reference to FIG. 7.

In this case, if the recovery order unit 140 determines that the management device 102 has received a recovery notification indicating that the specific terminal 101 has detected "Disconnected from LTE" by itself or that the terminal 101 has determined to execute self-recovery processing of "Rebooting communication I/F for LTE", the recovery order unit 140 determines that a recovery notification has been received.

For example, in the case where the management device 102 receives a recovery notification indicating that the terminal 101 takes the measure of "Rebooting communication I/F for LTE" for an abnormal event detected by the terminal 101, which is however different from the abnormal event detected by the management device 102, the desirable recovery processing will be executed by the terminal 101 even though the detected abnormal event is different. Accordingly, the recovery order unit 140 can determine not to issue a recovery order to avoid redundant recovery processing.

If the management device 102 has received such a recovery notification from the specific terminal 101 (YES), the recovery order unit 140 proceeds to Step S802 and if not (NO), proceeds to Step S803.

Step S802 is processing for the recovery order unit 140 to determine that an order to execute the recovery processing determined in the fault analysis processing in FIG. 7 is unnecessary and cancel the recovery order. Specifically, the processing is continued to the above-described processing of Step S507 in FIG. 5 to cancel the recovery order.

The terminal 101 can avoid execution of redundant recovery processing by the recovery order unit 140 canceling the recovery order in response to the determination at Step S801 that a recovery notification has been received from the terminal 101. Upon completion of the processing of Step S802, the recovery order unit 140 terminates the processing of FIG. 8.

Step S803 is processing for the recovery order unit 140 to determine that an order to execute the recovery processing determined in the fault analysis processing in FIG. 7 is necessary and send the recovery order to the specific terminal 101. Specifically, the processing is continued to the above-described processing of Step S601 in FIG. 6 to send a recovery order.

If non-receipt of the recovery notification from the specific terminal 101 is determined at Step S801, the terminal 101 is in a state of being unable to detect the abnormal event by itself. Accordingly, the terminal 101 becomes able to execute recovery processing because of the recovery order from the management device 102. Upon completion of the processing of Step S803, the recovery order unit 140 terminates the processing of FIG. 8.

Through the above-described recovery order issuance determination processing in FIG. 8, the recovery order unit 140 of the management device 102 can determine whether the recovery processing determined in the fault analysis processing in FIG. 7 is to be ordered. In addition, if determining the order is unnecessary because of receipt of a recovery notification from the terminal 101 where to send the order, the recovery order unit 140 cancels the recovery order to prevent the terminal 101 from redundantly executing recovery processing.

With reference to FIG. 9, an example of screen display for configuring the fault analysis condition management table 121a or 141a in FIG. 2, the event identification condition management table 122a or 142a in FIG. 3, and the recovery processing management table 123a or 143a in FIG. 4 is described.

The window 900 in FIG. 9 can be displayed by the output unit 114 of a terminal 101 and the output unit 134 of the management device 102. The window 900 includes a display area 901 for configuring fault analysis conditions, a display area 902 for configuring event identification conditions, and a display area 903 for configuring recovery processing.

The display area 901 is an area for configuring the fault analysis condition management table 121a or 141a in FIG. 2 to be managed by the fault analysis condition management unit 121 of the terminal 101 or the fault analysis condition management unit 141 of the management device 102, respectively.

When information such as reference information and a threshold value for each fault analysis condition is entered to the display area 901 through the input unit 113 or 133, the entered values are set to the fault analysis condition management table 121a or 141a. An additional fault analysis conditions may become necessary when the communication system is in operation. For this reason, the example 901 in FIG. 9 includes an Add button 904 for adding an entry (row) of fault analysis condition, enabling addition of a fault analysis condition as necessary in response to a press (or click) of this button.

The display area 902 is an area for configuring the event identification condition management table 122a or 142a in FIG. 3 to be managed by the event identification management unit 122 of the terminal 101 or the event identification management unit 142 of the management device 102, respectively.

When fault analysis conditions to be matched with each abnormal event are entered to the display area 902 through the input unit 113 or 133, the entered values are set to the event identification condition management table 122a or 142a. The example 902 in FIG. 9 also includes Add buttons 904 because another kind of abnormal event to be detected or an additional fault analysis condition to be matched may become necessary when the communication system is in operation.

The display area 903 is an area for configuring the recovery processing management table 123a or 143a in FIG. 4 to be managed by the recovery processing management unit 123 of the terminal 101 or the recovery processing management unit 143 of the management device 102, respectively.

When recovery processing to be executed and a waiting time until execution of the recovery processing for each abnormal event are entered to the display area 903 through the input unit 113 or 113, the entered values are set to the recovery processing management 123a or 143a. The example 903 in FIG. 9 also includes an Add button 904 because of the same reason as described above.

The information in these tables may be managed not only on the displayed window 900 of FIG. 9 but also in an external file. For this reason, the example of the screen display in FIG. 9 includes an Input File button 905 and an Output File button 906.

In response to a press of the Input File button 905 with the input unit 113 or 133, a function to retrieve the table values stored in an external file to the displayed window 900 of FIG. 9 is provided. In response to a press of the Output File button 906, a function to output the table values input through the displayed window 900 of FIG. 9 into an external file is provided.

These functions facilitate linkage with external files storing the table values, although these functions are optional. Displaying a configuration window for the information in the tables like FIG. 9 facilitates registering or altering table values. Although the example of screen display of FIG. 9 is configured to select a value for a table from a pull-down menu or directly enter a value, the way to accept a value through display can be selected desirably.

In addition to the configuration such that the window of FIG. 9 is displayed by each of the terminal 101 and the management device 102, there can be another configuration such that the output unit 134 of the management device 102 also displays the window for configuring the tables for the terminal 101 and sends the terminal 101 an external file output in response to a press of the Output File button 906 to register the values to the tables in the terminal 101. As noted from this description, it is not necessarily essential that both the terminal 101 and the management device 102 include their own input unit and output unit.

With reference to FIG. 10, an example of screen display to output an abnormal event detected and recovery processing determined through the self-fault-analysis processing by a terminal 101 or the fault analysis processing by the management device 102 in FIG. 7 is described.

The window 1000 in FIG. 10 can be displayed by the output unit 114 of the terminal 101 and the output unit 134 of the management device 102. The window 1000 includes a display area 1001 for displaying information on a detected fault and recovery therefrom.

The display area 1001 displays information on the detected abnormal event and the recovery processing for the abnormal event that are determined by the self-fault-analysis unit 118 of the terminal 101 or the fault analysis unit 138 of the management device 102.

Although the example of FIG. 10 includes information on the identifier of the terminal 101 exhibiting a fault, the detected abnormal event, the time of detection of the abnormal event, the device that has detected the abnormal event, and the recovery processing to be executed for the abnormal event, the display area 1001 can include any information as necessary. For example, the display area 1001 can further include a time scheduled to execute the recovery processing determined based on the waiting time 404 in the recovery processing management table 123a or 143a in FIG. 4.

Displaying a window like the one in FIG. 10 enables the system administrator or operator to easily know from which terminal an abnormal event is detected and what recovery processing is to be executed.

Especially in the case where the recovery processing to be executed has a possibility to cause a halt of the operation of the communication system, for example in the case of rebooting a terminal 101, the window 1000 enables the system administrator or operator to determine whether to take care of the matter, such as making advance preparation for the system halt.

The information can be output to the screen in the form of text, instead of the form of a table like the window 1000 in FIG. 10. The form of displaying the information on fault detection and recovery is not limited to a specific one.

As set forth above, this embodiment enables early detection of a fault in a terminal 101 or reinstatement of the terminal 101 from a communication disconnected state through self-analysis and self-recovery and further, enables detection of an abnormal event in the terminal 101 that cannot be detected by the terminal 101 itself and recovery from the abnormal event through analysis by the management device 102 and in accordance with a recovery order from the management device 102.

Furthermore, the configuration such that the terminal 101 sends a recovery notification to the management device 102 before executing self-recovery processing enables the management device 102 not to issue an order to execute redundant recovery processing, achieving efficient recovery of the terminal 101 from the fault. Since the foregoing processing is executed automatically, the man-hour required for the recovery work for a fault can be reduced. Moreover, the resultant earlier fault recovery contributes to improvement in operation availability of the communication system.

Embodiment 2

In the fault analysis processing of the management device 102 with its fault analysis unit 138 in the foregoing Embodiment 1, the management device 102 determines whether the log information of each terminal 101 satisfies any of the fault analysis conditions in the fault analysis condition management table 141a in FIG. 2.

In the configuration where a plurality of terminals 101 are connected to the management device 102 as shown in FIG. 1, an abnormal event may be able to be detected more specifically when multiple terminals 101 simultaneously satisfy the same fault analysis condition.

For example, assume that a fault analysis condition to determine that the LTE connection state of a terminal 101 is "0 (Disconnected)" is provided like the example in FIG. 2. When multiple (two or more) terminals 101 simultaneously satisfy this analysis condition, the possibility that the multiple terminals 101 are disconnected because of a fault in a facility (such as a base station) of the carrier providing the LTE communication network (mobile network) rather than a hardware fault of the terminals 101 is suspected. In this case, the fault is not a fault of the terminals 101 but is a fault of an external environment.

As understood from the above, adding simultaneous match of multiple terminals 101 with a fault analysis condition to the criteria for detection enables detection of more various faults. If the fault is caused by not each terminal 101 but an external environment like the forgoing example, recovery from the abnormal state is difficult only with self-recovery processing of each terminal 101.

For example, in the aforementioned example of the carrier fault, it is obvious that the terminals 101 will be in difficulties in reconnecting to the LTE network until the fault in the facility of the carrier is solved, even though the terminals 101 attempt self-recovery.

Accordingly, it is desirable that the terminals 101 do not execute self-recovery processing until the fault in the carrier is solved, even if they detect disconnection from LTE by themselves. Especially, the self-recovery processing of a terminal 101 includes processing that may cause a halt of the operation of the communication system, such as rebooting the terminal; it is desirable to temporarily disable the self-recovery processing of the terminals 101 so as to avoid ineffectual self-recovery processing.

In view of the above, Embodiment 2 describes a configuration such that simultaneous match of multiple terminals 101 with the same fault analysis condition is added to the criteria for the management device 102 to detect an abnormal event and the management device 102 determines whether to enable or disable self-recovery processing of the terminals 101 depending on the kind of the detected abnormal event.

The configurations of the tables to be managed by the fault analysis condition management unit 141, the event identification condition management unit 142, the recovery processing management unit 143 of the management device 102, and the recovery processing management unit 123 of each terminal 101 in Embodiment 2 are described with FIGS. 11A to 11D. Except for the configurations of the tables in FIGS. 11A to 11D, the configurations and processing in Embodiment 2 are the same as those of Embodiment 1 and therefore, description thereof is skipped herein.

FIG. 11A is a configuration diagram of the fault analysis condition management table 141a to be managed by the fault analysis condition management unit 141 of the management device 102 in Embodiment 2. An analysis condition ID 201, reference information 202, a comparison policy 303, a comparison condition 204, a threshold value 205, and a number of times of match 206 are the same as those in the fault analysis condition management table 141a in Embodiment 1 shown in FIG. 2 but the fault analysis condition management table 141a in Embodiment 2 further includes a field of number of terminals to be detected simultaneously 1101.

The number of terminals to be detected simultaneously 1101 indicates at least how many terminals 101 satisfying the analysis condition are necessary to be regarded as a match with the condition when the management device 102 analyzes log information collected from each terminal 101.

If the number of terminals 101 satisfying the analysis condition specified in the reference information 202, the comparison policy 203, the comparison condition 204, the threshold value 205, and the number of times of match 206 is not less than the value specified in the field of number of terminals to be detected simultaneously 1101, the fault analysis unit 138 of the management device 102 determines (detects) a match with the fault analysis condition.

In the case of using the example of FIG. 11A, if there are five or more terminals 101 satisfying the condition that the "LTE connection state" is "0 (Disconnected)", the management device 102 determines in the fault analysis processing (Step S701) in FIG. 7 that the analysis condition of the analysis condition ID "Multi-LteState" is satisfied. Since each terminal 101 performs self-fault-analysis processing on its own log information, the field of number of terminals to be detected simultaneously 1101 is not necessary in the fault analysis condition management table 121*a* to be managed by each terminal 101.

FIG. 11B is a configuration diagram of the event identification condition management table 142*a* to be managed by the event identification condition management unit 142 of the management device 102 in Embodiment 2. The configuration of the event identification condition management table 142*a* is the same as that of the event identification condition management table 142*a* in Embodiment 1 shown in FIG. 3. In the case of using the example of FIG. 11B, the management device 102 can detect an event of the event ID "NwFailure (Carrier fault)" in the fault analysis processing (Step S703) in FIG. 7 based on the match with the analysis condition of the analysis condition ID "Multi-LteState" in FIG. 11A.

FIGS. 11C and 11D are configuration diagrams of the recovery processing management table 143*a* to be managed by the recovery processing management unit 143 of the management device 102 and the recovery processing management table 123*a* to be managed by the recovery processing management unit 123 of each terminal 101 in Embodiment 2.

The event ID 401, the notification message 402, the recovery measure 403, and the waiting time 404 in FIGS. 11C and 11D are the same as those in the recovery processing management tables 123*a* and 143*a* in Embodiment 1 shown in FIG. 4 but the recovery processing management tables 123*a* and 143*a* in Embodiment 2 include an additional field of Enable/Disable 1102.

The Enable/Disable 1102 in FIGS. 11C and 11D are the fields to specify whether to enable or disable recovery processing when the abnormal event specified in the event ID 401 is detected. If this field includes "Disable", the processing specified in the recovery measure 403 is not executed even if the abnormal event specified in the event ID 401 is detected.

In the case of using the example of FIG. 11C, upon detection of an event of event ID "NwFailure (Carrier fault)", the management device 102 determines to disable the recovery processing for the fault of "Disconnection from LTE" in the terminals 101 satisfying the condition of the analysis condition ID "Multi-LteState". The fault of "Disconnection from LTE" is to be detected by each of the terminals 101 through their fault analysis processing in FIG. 7 (Step S705).

Subsequently, the management device 102 executes the recovery order issuance determination processing in FIG. 8 like in the flow illustrated in FIG. 6 and instructs the pertinent terminals 101 to disable their recovery processing as recovery orders through a communication I/F for communication other than LTE. In accordance with the order, each of the terminals 101 in receipt of the recovery order alters the field of Enable/Disable 1102 for the event ID "LteDisconn" (Disconnection from LTE) into "Disable" as shown in the example of FIG. 11D.

As a result of this processing, the terminals 101 do not execute self-recovery processing even if they detect an event "Disconnection from LTE". Accordingly, they can avoid execution of unnecessary self-recovery processing while a carrier fault occurs.

When to enable the disabled recovery processing can be specified as appropriate. For example, in the case of the foregoing example, the administrator can instruct the terminals 101 to enable the disabled recovery processing through the management device 102 when the carrier fault is solved or the terminals 101 ordered to disable the recovery processing can automatically enable the disabled recovery processing after a predetermined time has elapsed.

As set forth above, this embodiment enables detection of an abnormal event that cannot be detected through only the log information of a single terminal 101 by employing simultaneous match of multiple terminals 101 with the same fault analysis condition as a criterion for the management device 102 to detect an abnormal event in its fault analysis processing.

Furthermore, this embodiment can avoid execution of unnecessary self-recovery processing of a terminal 101 that is obviously unable to solve a fault, by enabling/disabling the self-recovery processing depending on the detected abnormal event.

Embodiment 3

Embodiment 1 provides a configuration such that the recovery processing management tables 123*a* or 143*a* in FIG. 4 includes a field of waiting time 404 to address inconvenience caused by self-recovery processing of a terminal 101 executed immediately after detection of an abnormal event.

The waiting time between detection of a fault and execution of self-recovery processing may need a change flexibly depending on the situation where the abnormal event occurs. In this case, there is an approach that the terminal 101 suspends execution of self-recovery processing until receiving a recovery order (permission) from the management device 102, after sending a recovery notification about the recovery processing to the management device 102.

Any length of waiting time can be provided by the management device 102 instructing the terminal 101 to execute recovery processing when the management device 102 permits it. For example, assume that the management device 102 has information on the operation schedule of the communication system and knows the timeslot in which disconnection of communication by firmware update of an apparatus on the site is not allowed. When the management device 102 receives a recovery notification from a terminal 101 within the timeslot, the management device 102 does not send a recovery order immediately and withholds a recovery order until the end of the timeslot. As a result, temporary disconnection of communication caused by self-recovery processing (such as rebooting a terminal 101) can be avoided.

There can be another case such that an anomaly detected by a terminal 101 is actually a deliberate abnormal event caused by a scheduled system halt and self-recovery processing is unnecessary. For example, assume that a terminal 101 and apparatuses on the site are connected via wired communication and the terminal 101 detects disconnection of the wired communication when the apparatuses are powered off because of a scheduled halt of the communication system.

Since this situation is artificially created because of a scheduled halt; it is obvious that the self-recovery processing for the disconnection is unnecessary. If the management device 102 has information on the operation schedule of the communication system and knows the timeslot of the system halt like the above-described case, unnecessary self-recovery processing can be avoided by the management device 102 not sending a recovery order even if receiving a recovery notification from the terminal 101 within the timeslot.

In view of the above, Embodiment 3 describes a configuration such that a terminal 101 suspends execution of self-recovery processing until receiving a recovery order from the management device 102, after sending a recovery notification about the self-recovery processing to the management device 102.

The terminal 101 in Embodiment 1 executes self-recovery processing after sending a recovery notification to the management device 102 as illustrated in FIG. 5. However, the terminal 101 in this embodiment suspends execution of the recovery processing until receipt of a recovery order from the management device 102.

The management device 102 in Embodiment 1 merely records the contents of a recovery notification received from a terminal 101 with the recovery notification receiving unit 139. However, the management device 102 in Embodiment 3 further determines whether to permit the terminal 101 to execute the self-recovery processing. The management device 102 sends a recovery order to the terminal 101 at an appropriate time only if determining that the recovery processing can be executed. The recovery order to be sent from the management device 102 is a reply to the recovery notification sent from the terminal 101.

Figures 12, 13:
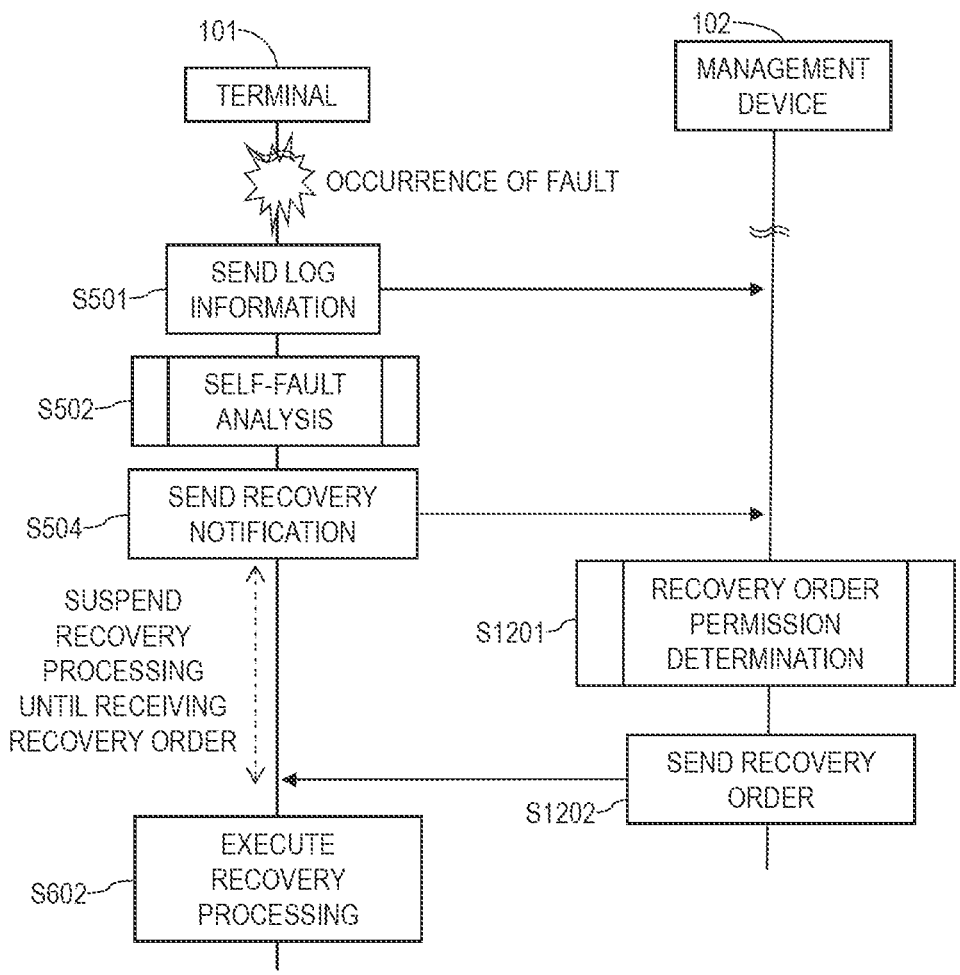
FIG. 12 is a sequence diagram illustrating a flow of fault analysis and recovery by the management device and a terminal in Embodiment 3.
FIG. 13 is an explanatory diagram illustrating an example of system operation schedule information to be held by the management device in Embodiment 3.

The flow of fault analysis and recovery processing in Embodiment 3 to be performed by a terminal 101 and the management device 102 is described with FIG. 12. An example of system operation schedule information 1300 to be held by the management device 102 is described with FIG. 13. Recovery order permission determination processing to be performed by the management device 102 that has received a recovery notification from the terminal 101 is described with FIG. 14. Except for the processing illustrated in FIGS. 12 to 14, the configurations and processing in Embodiment 3 are the same as those of Embodiment 1 or Embodiment 2 and therefore, description of the common configurations is skipped herein.

With reference to FIG. 12, a flow of fault analysis and recovery processing in Embodiment 3 to be performed by a terminal 101 and the management device 102 is described. Steps S501, S502, S504, and S602 in FIG. 12 are the same as those shown in FIG. 5 or 6 in Embodiment 1 or 2 and therefore description thereof is skipped herein.

After sending a recovery notification at Step S504, the terminal 101 suspends execution of the recovery processing until receiving a recovery order from the management device 102 as illustrated in FIG. 12. When the management device 102 receives the recovery notification sent by the terminal 101 at Step S504, the management device 102 in Embodiment 3 provides the contents of the notification analyzed by the communication processing unit 137 to the recovery notification receiving unit 139 and the recovery order unit 140 and proceeds to Step S1201.

Step S1201 is processing for the recovery order unit 140 of the management device 102 to determine whether to permit the terminal 101 of the sender of the recovery notification to execute the self-recovery processing for the abnormal event based on the recovery notification sent from the terminal 101 at Step S504.

Specifically, the recovery order unit 140 determines whether the abnormal event detected by the terminal 101 is caused by a scheduled halt of the communication system with reference to the system operation schedule information 1300 (which will be described later with FIG. 13) held by the management device 102 and if positive, cancels sending a recovery order because the self-recovery processing is not necessary.

If the abnormal event detected by the terminal 101 is not a scheduled halt of the communication system and is an unexpected abnormal event, the management device 102 proceeds to the recovery order sending processing of Step S1202 at a time appropriate for the operation schedule of the communication system. The details of the processing of Step S1201 will be described later with FIG. 14.

Step S1202 is processing for the recovery order unit 140 of the management device 102 to send a recovery order to the pertinent terminal 101. In the recovery order sending processing in Embodiment 1 or 2 in FIG. 6 (S601), the recovery order unit 140 sends an order to execute the recovery processing determined in the fault analysis processing (S503). In the recovery order sending processing of Step S1202, however, the recovery order unit 140 sends an order to execute the self-recovery processing specified in the recovery notification sent at Step S504.

If the recovery notification sent from the terminal 101 includes only the information on the abnormal event detected by the terminal 101, the recovery order unit 140 refers to the recovery processing management table managed by the recovery processing management unit 143 and sends an order to execute the recovery processing for the abnormal event.

Upon receipt of the recovery order, the terminal 101 executes the designated recovery order with the self-recovery processing unit 120 at Step S602.

As described above, the management device 102 determines whether to permit the terminal 101 to execute self-recovery processing and cancels sending a recovery order or controls the time to send the recovery order. This configuration enables avoidance of execution of recovery processing at an inconvenient time or execution of unnecessary recovery processing.

With reference to FIG. 13, an example of the system operation schedule information 1300 to be held by the management device 102 is described. The system operation schedule information 1300 is managed by the application program 136 of the management device 102 and as described above, it is used to determine whether to permit a terminal 101 to execute self-recovery processing when the management device 102 receives a recovery notification. The system operation schedule information 1300 is stored in the storage device 135 of the management device 102.

A scheduled activity 1301 in FIG. 13 indicates information on the operation schedule of the communication system. This field can be expressed in any form; a note for avoiding disconnection of communication by updating the firmware of an apparatus (terminal 101) on the site or a note prohibiting recovery processing to cause disconnection of communication (such as rebooting a terminal or a communication I/F) can be added as shown in the example in FIG. 13.

A related terminal field 1302 in FIG. 13 indicates the identifiers of the terminals 101 to be involved in the activity indicated in the scheduled activity 1301. In FIG. 13, an identifier of a terminal 101 is expressed by a suffix shown in FIG. 1; however, this identifier can be expressed in any form, such as a serial number of the terminal 101 or the IP address (or the MAC address) assigned to its communication I/F.

The management device 102 in receipt of a recovery notification from a terminal 101 can identify the scheduled activity to be taken into account for the recovery processing of the terminal 101 with reference to the related terminal 1302 in determining whether to permit the terminal 101 to execute the self-recovery processing.

A date and time field 1303 indicates information on the date and time to execute the activity indicated in the scheduled activity 1301. With reference to this field, the management device 102 can determine that, for example, the communication system is scheduled to be down during the period of "2021/9/22 02:00:00-03:00:00" and the abnormal event detected by the terminals 101-a and 101-b in this timeslot has occurred as scheduled and therefore, the self-recovery is unnecessary.

Although FIG. 13 includes fields of scheduled activity 1301, related terminal 1302, and date and time 1303 as examples of system operation schedule information 1300, the system operation schedule information to be held by the management device 102 is not limited to be in a specific format. For example, in the case where a scheduled activity is conducted periodically in a specific timeslot on a specific day of a week, the field of the date and time 1303 can be altered to indicate the day of a week and the timeslot or a new field can be added as appropriate.

Figure 14:
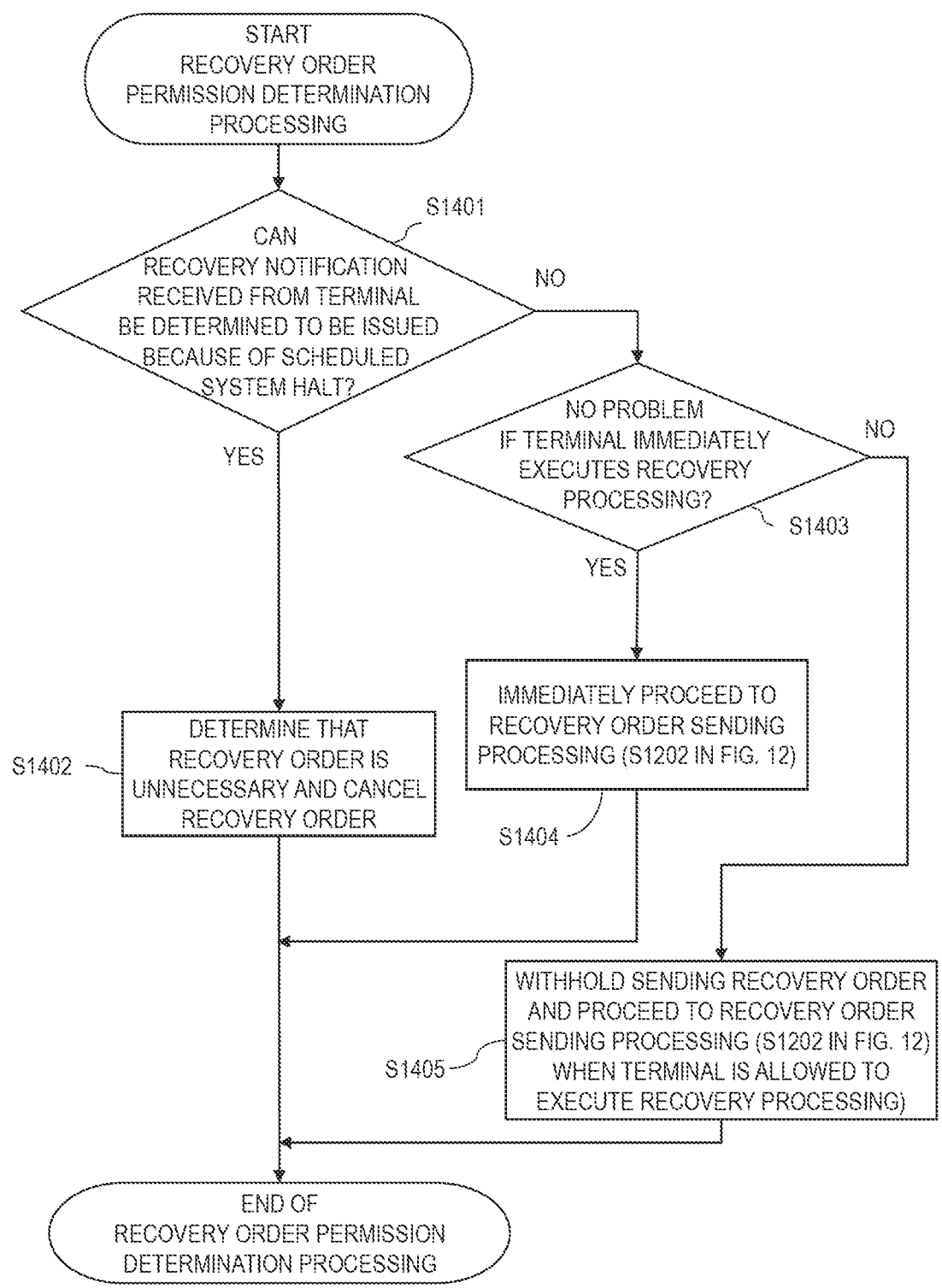
FIG. 14 is a flowchart of an example of recovery order permission determination processing of the management device in Embodiment 3.

With reference to FIG. 14, the recovery order permission determination processing to be executed by the recovery order unit 140 of the management device 102 is described. Specifically, it corresponds to the processing of Step S1201 in FIG. 12. This processing is executed when the management device 102 has received a recovery notification from a terminal 101 and determines whether to permit the terminal 101 to execute self-recovery processing based on the system operation schedule information 1300.

FIG. 14 is a flowchart of an example of the recovery order permission determination processing of the management device 102 in Embodiment 3; the details are described as follows.

Step S1401 is processing for the management device 102 to determine whether the abnormal event detected by the terminal 101 of the sender of the recovery notification is caused by a scheduled halt of the communication system. Specifically, the recovery order unit 140 of the management device 102 determines whether the communication system the terminal 101 of the sender of the recovery notification belongs to is down as scheduled with reference to the system operation schedule information 1300 of FIG. 13 managed by the application program 136.

Using the example of FIG. 13, if the management device 102 receives a recovery notification from the terminal 101-a at "2021/9/22 02:30:00", the recovery order unit 140 can determine that the recovery notification is for an event caused by a scheduled system halt.

If the recovery order unit 140 can determine that the abnormal event is caused by a scheduled system halt (YES), the recovery order unit 140 proceeds to Step S1402. If the event is an unexpected one that has occurred outside the period of a scheduled system halt (NO), the recovery order unit proceeds to Step S1403.

Step S1402 is processing for the recovery order unit 140 of the management device 102 to determine that a recovery order is unnecessary and cancels the recovery order for the recovery notification. If the recovery order unit 140 can determine that the abnormal event is caused by a scheduled system halt, the self-recovery processing by the terminal 101 is unnecessary. Accordingly, execution of the unnecessary self-recovery processing can be avoided by this processing of canceling the recovery order.

Although the recovery order unit 140 in the example of FIG. 14 merely cancels the recovery order, the recovery order unit 140 can explicitly notify the terminal 101 of the unnecessity of the self-recovery processing. Upon completion of the processing of Step S1402, the recovery order unit 140 terminates the processing of FIG. 14.

Step S1403 is processing for the recovery order unit 140 to determine whether immediate execution of the recovery processing at the terminal 101 of the sender of the recovery notification causes any trouble. Specifically, the recovery order unit 140 of the management device 102 determines whether the recovery processing the terminal 101 is going to execute is prohibited with reference to the system operation schedule information 1300 in FIG. 13 managed by the application program 136.

For example, in the case where the management device 102 has received a recovery notification indicating that the self-recovery processing is "Rebooting the terminal" at "2021/9/20 00:15:00", the example of FIG. 13 prohibits execution of the specific recovery processing until "2021/9/20 00:30:00" because of "Update of firmware of apparatuses on the site" and therefore, the recovery order unit 140 can determine that the execution of the recovery processing should be suspended for at least 15 minutes.

If the recovery order unit 140 can determine that the terminal 101 is allowed to execute the recovery processing immediately (YES), the recovery order unit 140 proceeds to Step S1404. If execution of the recovery processing needs to be suspended as described in the foregoing example (NO), the recovery order unit 140 proceeds to Step S1405.

Step S1404 is processing for the recovery order unit 140 to determine to permit immediate execution of the recovery processing by the terminal 101 of the sender of the recovery notification and send a recovery order to the terminal 101.

Specifically, the recovery order unit 140 immediately proceeds to the recovery order sending processing described at Step S1202 in FIG. 12 and sends the recovery order to the terminal 101. Upon completion of the processing of Step S1404, the recovery order unit 140 terminates the processing of FIG. 14.

Step S1405 is processing for the recovery order unit 140 to determine that the terminal 101 of the sender of the recovery notification needs to suspend execution of the recovery processing and send a recovery order to the terminal 101 when the recovery processing is allowed to be executed in view of the operation schedule of the communication system.

Specifically, the recovery order unit 140 proceeds to the recovery order sending processing described at Step S1202 in FIG. 12 when the terminal 101 has become allowed to execute the recovery processing in accordance with the system operation schedule information 1300 of FIG. 13 and sends a recovery order to the terminal 101.

In the case of the example provided for Step S1403, the recovery processing needs to be suspended for at least 15 minutes from receipt of a recovery notification and accordingly, the recovery order unit 140 performs processing to send a recovery order after elapse of 15 minutes.

Because of withholding a recovery order at Step S1405, the terminal 101 can execute the self-recovery processing at an appropriate time for the operation schedule of the communication system. Although Step S1405 in FIG. 14 provides an example of withholding a recovery order until execution of the recovery processing is allowed, the recovery order unit 140 can immediately send a recovery order specifying the time to execute the recovery processing to the terminal 101 and the terminal 101 that has received the order suspends execution of the self-recovery processing until the specified time.

As set forth above, this embodiment enables avoidance of unnecessary self-recovery processing by a terminal 101 for an abnormal event caused by a scheduled deliberate halt of the communication system and in addition, enables execution of recovery processing at an appropriate time for the operation schedule of the communication system by the management device 102 determining whether a terminal 101 is allowed to execute self-recovery processing.

Particularly, it is preposterous that self-recovery processing interferes with the operation of the communication system. Executing recovery processing at an appropriate time for the operation schedule contributes to further improvement in operation availability of the communication system.

Closing

As set forth above, the communication system in Embodiments 1 to 3 can be configured as follows.

(1) A communication system comprising one or more terminals (101) to be managed and a management device (102) connected to the terminals (101), wherein each of the terminals (101) includes a log information management unit (application program 116) configured to collect own log information of the terminal (101) and send the log information to the management device (102), a self-fault-analysis unit (118) configured to analyze the log information to determine whether any abnormal event occurs in the terminal (101) and determine self-recovery processing in a case of detecting an abnormal event, a recovery notification sending unit (119) configured to notify the management device (102) of the self-recovery processing for the abnormal event, and a self-recovery processing unit (120) configured to execute the self-recovery processing for the abnormal event or recovery processing ordered by the management device (102) and the management device (102) includes a fault analysis unit (138) configured to analyze log information collected from the terminals (101) to determine whether any abnormal event occurs in any of the terminals (101) and determine recovery processing in a case of detecting an abnormal event, a recovery notification receiving unit (139) configured to receive a notification about self-recovery processing for an abnormal event detected by a terminal (101) from the terminal (101), and a recovery order unit (140) configured to issue or not to issue an order to execute the recovery processing for the abnormal event detected by the fault analysis unit (138) to the terminal (101), depending on whether the notification about self-recovery processing has been received.

Through this configuration, a terminal and a management device 102 both analyze log information of the terminal 101 to determine whether any abnormal event occurs in the terminal 101. As a result, the terminal 101 can detect a fault earlier or recover from a communication disconnected state through self-analysis and self-recovery by the terminal 101 and even more, the terminal 101 can recover from an abnormal event undetectable for the terminal itself through the analysis by the management device 102 and a recovery order therefrom.

However, if a terminal 101 and the management device 102 both detect and address the same abnormal event, the terminal 101 may execute recovery processing redundantly. For example, assume that a terminal 101 and the management device 102 detect an abnormal event in the terminal 101 at almost the same time. In response, the terminal 101 executes self-recovery processing for the detected abnormal event but the management device 102 does not know the recovery and orders the terminal 101 to execute recovery processing. As a result, the terminal 101 has to execute redundant recovery processing again and in the case of the recovery by rebooting, the recovery processing interferes with continuous operation of the terminal 101. According to this invention, however, the terminal 101 explicitly sends a notification about the recovery processing to the management device 102 in executing the self-recovery processing. The management device 102 therefore can determine that the recovery order is unnecessary and avoid execution of redundant recovery processing.

(2) A management device (102) connected to one or more terminals (101) to be managed, the management device (102) comprising a processor (CPU 132), a memory (storage device 135), a fault analysis unit (138) configured to analyze log information collected from the terminals (101) to determine whether any abnormal event occurs in any of the terminals (101) and determine recovery processing in a case of detecting an abnormal event, a recovery notification receiving unit (139) configured to receive a notification about self-recovery processing for an abnormal event detected by a terminal (101) from the terminal (101), and a recovery order unit (140) configured to issue or not to issue an order to execute the recovery processing for the abnormal event detected by the fault analysis unit (138) to the terminal (101) depending on whether the notification about self-recovery processing has been received.

Through this configuration, a terminal 101 and a management device 102 both analyze log information of the terminal 101 to determine whether any abnormal event occurs in the terminal 101. As a result, the terminal 101 can detect a fault earlier or recover from a communication disconnected state through self-analysis and self-recovery by the terminal 101 and even more, the terminal 101 can recover from an abnormal event undetectable for the terminal itself through the analysis by the management device 102 and a recovery order therefrom.

(3) The management device (102) according to the foregoing (2), further comprising a fault analysis condition management unit (141) configured to manage fault analysis conditions for the log information, an event identification condition management unit (142) configured to manage event identification conditions each based on a combination of fault analysis conditions to be satisfied by the log information, and a recovery processing management unit (143) configured to manage recovery processing to be executed depending on abnormal events, wherein the fault analysis unit (138) is configured to analyze the log information in accordance with the fault analysis conditions of the fault analysis condition management unit (141), detect an abnormal event in a terminal (101) based on a result of the analysis and the event identification conditions of the event identification condition management unit (142), consult the recovery processing management unit (143) to determine recovery processing for the abnormal event and the recovery order unit (140) is configured to issue an order to execute the recovery processing to the terminal (101) in a case where the recovery notification receiving unit (139) does not receive a notification about self-recovery processing for the abnormal event from the terminal (101).

Through this configuration, the management device 102 detects an abnormal event in a terminal 101 using log information therefrom and issues an order to execute recovery processing to the terminal 101 unless receiving a notification about the recovery processing from the terminal 101. As a result, the terminal 101 can recover from an abnormal event undetectable for the terminal 101 itself.

(4) The management device (102) according to the foregoing (3), wherein the fault analysis condition management unit (141) is configured to be able to specify log information to be analyzed (reference information 202), a threshold value (205) to be a criterion for comparison, a comparison condition (204) specifying a magnitude relation with respect to the threshold value (205), a comparison policy (203) specifying whether to treat the threshold value (205) as an absolute value or a relative value, and a number of times log information needs to match a fault analysis condition (number of times of match 206) for each of the fault analysis conditions.

Through this configuration, the fault analysis condition management unit 141 of the management device 102 can specify log information to be analyzed (reference information 202), a threshold value 205 to be a criterion for comparison, a comparison condition 204 specifying a magnitude relation with respect to the threshold value 205, a comparison policy 203 specifying whether to treat the threshold value 205 as an absolute value or a relative value, and a number of times of match 206 for the log information to satisfy the fault analysis condition for each of the fault analysis conditions in the fault analysis condition management table 141a. As a result, fault analysis conditions suitable for the environment of the terminals 101 can be configured.

(5) The management device (102) according to the foregoing (3), wherein the recovery processing management unit (143) is configured to be able to specify recovery processing (recovery measure 403) to be executed and a waiting time (404) between detection of an abnormal event and sending a recovery order for each abnormal event.

Through this configuration, the recovery processing management unit 143 can specify a recovery measure 403 to be taken and a waiting time 404 between detection of an abnormal event and sending a recovery order for each abnormal event in the recovery processing management table 143a. As a result, recovery processing for abnormal events that may occur in the terminals 101 can be provided.

(6) The management device (102) according to the foregoing (3), further comprising an input unit (133) configured to input fault analysis conditions to be managed by the fault analysis condition management unit (141), event identification conditions to be managed by the event identification condition management unit (142), and recovery processing to be managed by the recovery processing management unit (143) and an output unit (134) configured to output information on an abnormal event detected by the fault analysis unit (138) and recovery processing for the abnormal event.

Through this configuration, the management device 102 can input fault analysis conditions, event identification conditions, and recovery processing with the input unit 133 and output information on an abnormal event and recovery processing for the abnormal event with the output unit 134.

(7) The management device (102) according to the foregoing (2), wherein the fault analysis unit (138) is configured to determine that an abnormal event occurs in a terminal (101) in a case where two or more of the terminals (101) satisfy a predetermined fault analysis condition.

Through this configuration, the management device 102 employs simultaneous matches of multiple terminals 101 with the same fault analysis condition as a criterion for detecting an abnormal event in its fault analysis processing. As a result, detection of an abnormal event that cannot be detected from the log information of a single terminal 101 becomes available.

(8) The management device (102) according to the foregoing (7), wherein the recovery order unit (140) is configured to order the terminal (101) to enable or disable predetermined recovery processing depending on the abnormal event occurring in the terminal (101).

Through this configuration, the management device 102 enables/disables self-recovery processing by the terminal 101 depending on the detected abnormal event. Then, in a case such that the terminal 101 obviously cannot reinstate by itself, execution of unnecessary self-recovery processing can be avoided.

(9) The management device (102) according to the foregoing (2), wherein the recovery order unit (140) is configured to, in a case where the recovery notification receiving unit (139) has received a self-recovery notification from a terminal (101), determine whether to permit execution of the recovery processing and issue an order to execute the recovery processing to the terminal (101) when the recovery processing is allowed to be executed.

Through this configuration, the management device 102 determines whether to permit the terminal 101 to execute self-recovery processing. As a result, unnecessary self-recovery processing for an abnormal event caused by a scheduled man-made halt of the communication system can be avoided and in addition, recovery processing can be executed at an appropriate time for the operation schedule of the communication system. It is preposterous that self-recovery processing interferes with the operation of the communication system. Executing recovery processing at an appropriate time for the operation schedule contributes to further improvement in operation availability of the communication system.

It should be noted that this invention is not limited to the above-described embodiments but include various modifications. For example, the above-described embodiments provide details for the sake of better understanding of this invention; they are not necessarily limited to those including all the described configurations. A part of the configuration of an embodiment can be replaced with a configuration of another embodiment or a configuration of an embodiment can be incorporated into a configuration of another embodiment. As to a part of a configuration of an embodiment, either one or both of addition of another configuration and replacement with another configuration can be applicable.

The above-described configurations, functions, processing units, and processing measures for all or a part of them, can be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, an SD card, or a DVD.

The drawings show control lines and information lines as considered necessary for explanations but do not show all control lines or information lines in the products. It can be considered that most of all components are actually interconnected.

Supplemental

Representative aspects of this invention other than the ones recited in the appended claims can be provided as follows.

<16>

A terminal connected to a management device and comprising:
 a processor;
 a memory;
 a log information management unit configured to collect own log information of the terminal and send the log information to the management device;
 a self-fault-analysis unit configured to analyze the log information to determine whether any abnormal event occurs in the terminal and determine self-recovery processing in a case of detecting an abnormal event;
 a recovery notification sending unit configured to notify the management device of the self-recovery processing for the abnormal event; and
 a self-recovery processing unit configured to execute the self-recovery processing for the anormal event or recovery processing ordered by the management device,
 wherein the self-recovery processing unit is configured to suspend execution of the self-recovery processing after notifying the management device of the self-recovery processing with the recovery notification sending unit until receiving an order to execute the self-recovery processing from the management device.

<17>

A method for a management device connected to one or more terminals to manage the terminals, the method comprising:
 a first step of collecting, by each of the terminals, log information of own log information of the terminal and send the log information to the management device;
 a second step of analyzing, by each of the terminals, the own log information to determine whether any abnormal event occurs in the terminal and determining self-recovery processing in a case of detecting an abnormal event;
 a third step of notifying, by a terminal that has detected an abnormal event, the management device of the self-recovery processing for the abnormal event;
 a fourth step of analyzing, by the management device, log information collected from the terminals to determine whether any abnormal event occurs in any of the terminals and determining recovery processing in a case of detecting an abnormal event;
 a fifth step of receiving, by the management device, a notification about the self-recovery processing for the abnormal event detected by the terminal from the terminal;
 a sixth step of issuing or not issuing, by the management device, an order to execute the recovery processing for the abnormal event detected by the management device, depending on whether the notification has been received; and a seventh step of executing, by the terminal, the self-recovery processing for the abnormal event or the recovery processing ordered by the management device.

What is claimed is:

1. A management device connected to one or more terminals to be managed, the management device comprising:
 a processor;
 a memory;
 a fault analysis unit configured to analyze log information collected from the terminals to determine whether any abnormal event occurs in any of the terminals and determine recovery processing in a case of detecting an abnormal event;
 a recovery notification receiving unit configured to receive a notification about self-recovery processing for an abnormal event detected by the terminal from the terminal;
 a recovery order unit configured to issue or not to issue an order to execute the recovery processing for the abnormal event detected by the fault analysis unit to the terminal, depending on whether the notification has been received;
 a fault analysis condition management unit configured to manage fault analysis conditions for the log information;
 an event identification condition management unit configured to manage event identification conditions each based on a combination of one or more fault analysis conditions to be satisfied by the log information; and
 a recovery processing management unit configured to manage recovery processing to be executed depending on abnormal events;
 wherein the fault analysis unit is configured to analyze the log information in accordance with the fault analysis conditions of the fault analysis condition management unit, detect an abnormal event in the terminal based on a result of the analysis and the event identification conditions of the event identification condition management unit, consult the recovery processing management unit to determine recovery processing for the abnormal event; and
 wherein the recovery order unit is configured to issue an order to execute the recovery processing to the terminal in a case where the recovery notification receiving unit does not receive a notification about self-recovery processing for the abnormal event from the terminal;
 wherein the fault analysis condition management unit is configured to be able to specify log information to be analyzed, a threshold value to be a criterion for comparison, a comparison condition specifying a magnitude relation with respect to the threshold value, a comparison policy specifying whether to treat the threshold value as an absolute value or a relative value, and a number of times log information needs to match a fault analysis condition for each of the fault analysis conditions.

2. The management device according to claim 1, wherein the recovery processing management unit is configured to be able to specify recovery processing to be executed and a waiting time between detection of an abnormal event and sending a recovery order for each abnormal event.

3. The management device according to claim 1, further comprising:
 an input unit configured to input fault analysis conditions to be managed by the fault analysis condition management unit, event identification conditions to be managed by the event identification condition management unit, and recovery processing to be managed by the recovery processing management unit; and an output unit configured to output information on an abnormal event detected by the fault analysis unit and recovery processing for the abnormal event.

4. The management device according to claim 1, wherein the fault analysis unit is configured to determine that an abnormal event occurs in a terminal in a case where two or more of the terminals satisfy a predetermined fault analysis condition.

5. The management device according to claim 4, wherein the recovery order unit is configured to order the terminal to enable or disable predetermined recovery processing depending on the abnormal event occurring in the terminal.

6. The management device according to claim 1, wherein the recovery order unit is configured to, in a case where the recovery notification receiving unit has received a self-recovery notification from a terminal, determine whether to permit execution of the self-recovery processing and issue an order to execute the self-recovery processing to the terminal when the self-recovery processing is allowed to be executed.

7. A terminal connected to a management device, the terminal comprising:
   a processor;
   a memory;
   a log information management unit configured to collect own log information of the terminal and send the log information to the management device;
   a self-fault-analysis unit configured to analyze the log information to determine whether any abnormal event occurs in the terminal and determine self-recovery processing in a case of detecting an abnormal event;
   a recovery notification sending unit configured to notify the management device of the self-recovery processing for the abnormal event;
   a self-recovery processing unit configured to execute the self-recovery processing for the anormal event or recovery processing ordered by the management device;
   a fault analysis-condition management unit configured to manage fault analysis conditions for the log information;
   an event identification condition management unit configured to manage event identification conditions each based on a combination of one or more fault analysis conditions to be satisfied by the log information; and
   a recovery processing management unit configured to manage recovery processing to be executed depending on abnormal events;
   wherein the self-fault-analysis unit is configured to analyze the log information in accordance with the fault analysis conditions of the fault analysis condition management unit, detect an abnormal event in the terminal based on a result of the analysis and the event identification conditions of the event identification condition management unit, consult the recovery processing management unit to determine recovery processing for the abnormal event;
   wherein the self-recovery processing unit is configured to execute the recovery processing after notifying the management device of the recovery processing with the recovery notification sending unit or execute recovery processing specified in an order from the management device; and
   wherein the fault analysis condition management unit is configured to be able to specify log information to be analyzed, a threshold value to be a criterion for comparison, a comparison condition specifying a magnitude relation with respect to the threshold value, a comparison policy specifying whether to treat the threshold value as an absolute value or a relative value, and a number of times log information needs to match for each of the fault analysis conditions.

8. The terminal according to claim 7, further comprising:
   an input unit configured to input fault analysis conditions to be managed by the fault analysis condition management unit, event identification conditions to be managed by the event identification condition management unit, and recovery processing to be managed by the recovery processing management unit; and
   an output unit configured to output information on an abnormal event detected by the self-fault-analysis unit and recovery processing for the abnormal event.

9. The terminal according to claim 7, wherein the self-recovery processing unit is configured to enable or disable some of the recovery processing in accordance with an order from the management device.

10. A terminal connected to a management device, the terminal comprising:
    a processor;
    a memory;
    a log information management unit configured to collect own log information of the terminal and send the log information to the management device;
    a self-fault-analysis unit configured to analyze the log information to determine whether any abnormal event occurs in the terminal and determine self-recovery processing in a case of detecting an abnormal event;
    a recovery notification sending unit configured to notify the management device of the self-recovery processing for the abnormal event;
    a self-recovery processing unit configured to execute the self-recovery processing for the anormal event or recovery processing ordered by the management device;
    a fault analysis-condition management unit configured to manage fault analysis conditions for the log information;
    an event identification condition management unit configured to manage event identification conditions each based on a combination of one or more fault analysis conditions to be satisfied by the log information; and
    a recovery processing management unit configured to manage recovery processing to be executed depending on abnormal events;
    wherein the self-fault-analysis unit is configured to analyze the log information in accordance with the fault analysis conditions of the fault analysis condition management unit, detect an abnormal event in the terminal based on a result of the analysis and the event identification conditions of the event identification condition management unit, consult the recovery processing management unit to determine recovery processing for the abnormal event;
    wherein the self-recovery processing unit is configured to execute the recovery processing after notifying the management device of the recovery processing with the recovery notification sending unit or execute recovery processing specified in an order from the management device; and
    wherein the recovery processing management unit is configured to be able to specify recovery processing to be executed, a waiting time between detection of an abnormal event and execution of recovery processing, and contents for a notification for the management device for each abnormal event.

* * * * *